(12) United States Patent
Maier et al.

(10) Patent No.: US 11,472,675 B2
(45) Date of Patent: Oct. 18, 2022

(54) CONNECTION DEVICE, POWER SUPPLY SYSTEM AND METHOD FOR CONNECTION OF A LINE CABLE TO THE CONNECTION DEVICE

(71) Applicant: Conductix-Wampfler GmbH, Weil am Rhein (DE)

(72) Inventors: Bernd Maier, Schliengen (DE); Frank Kreiter, Malsburg (DE); Martin Nöltner, Lörrach-Haagen (DE); Dietmar Lang, Schliengen (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 771 days.

(21) Appl. No.: 16/342,622

(22) PCT Filed: May 3, 2018

(86) PCT No.: PCT/EP2018/061359
§ 371 (c)(1),
(2) Date: Apr. 17, 2019

(87) PCT Pub. No.: WO2018/206393
PCT Pub. Date: Nov. 15, 2018

(65) Prior Publication Data
US 2019/0263636 A1    Aug. 29, 2019

(30) Foreign Application Priority Data

May 9, 2017   (DE) .................... 10 2017 109 988.3

(51) Int. Cl.
*B66C 13/12*    (2006.01)
*B66C 19/00*    (2006.01)
(Continued)

(52) U.S. Cl.
CPC .............. *B66C 13/12* (2013.01); *B60L 53/16* (2019.02); *B60L 53/35* (2019.02); *B66C 13/085* (2013.01);
(Continued)

(58) Field of Classification Search
CPC ....... B66C 13/04; B66C 13/06; B66C 13/063; B66C 13/08; B66C 13/085; B66C 13/10;
(Continued)

(56) References Cited

U.S. PATENT DOCUMENTS 4,952,165 A    8/1990  Blaseck
5,306,999 A *  4/1994  Hoffman ................. B60L 53/16
                                                    320/109
(Continued)

FOREIGN PATENT DOCUMENTS

CA    2683194 A    4/2010
CN    1891610 A    1/2007
(Continued)

OTHER PUBLICATIONS

International Search Report dated Jul. 26, 2018 for PCT/EP2018/061359 filed May 3, 2018.
(Continued)

*Primary Examiner* — S. Joseph Morano
*Assistant Examiner* — Cheng Lin
(74) *Attorney, Agent, or Firm* — Paul D. Bianco; Gary S. Winer; Fleit Intellectual Property Law

(57) ABSTRACT

A connecting arrangement by which an electric load, which can be displaced in at least one direction of travel in relation to a feeder device, is supplied, by a cable, with electrical energy and/or data. The feeder device has at least one connection member for connecting to a corresponding connecting element of a cable carried by the electric load. An energy-supply system supplies the electric load. A simplified (Continued)

automatic connection of the cable to the feeder device by a connecting arrangement has a manipulator for connecting the connecting element to the connection member. A related energy-supply system has such a connecting arrangement and a related method has the following steps: a) positioning the connecting element in relation to the feeder device, b) using a manipulator to grip the connecting element and/or the cable, and c) using the manipulator to connect the connecting element to the connection member.

26 Claims, 20 Drawing Sheets

(51) Int. Cl.
  *H02G 11/02* (2006.01)
  *B66C 13/08* (2006.01)
  *B60L 53/35* (2019.01)
  *B60L 53/16* (2019.01)
  *H02G 11/00* (2006.01)

(52) U.S. Cl.
  CPC .......... *B66C 19/007* (2013.01); *H02G 11/02* (2013.01); *H02G 11/003* (2013.01); *Y02T 90/12* (2013.01); *Y02T 90/14* (2013.01)

(58) Field of Classification Search
  CPC ....... B66C 13/105; B66C 13/12; B66C 13/14; B66C 19/00; B66C 19/007; H02G 11/00; H02G 11/003; H02G 11/006; H02G 11/02; Y02T 90/14; Y02T 90/12; B60L 53/16; B60L 53/35
  See application file for complete search history.

(56) References Cited

U.S. PATENT DOCUMENTS

| | | | | |
|---|---|---|---|---|
| 6,194,854 | B1 * | 2/2001 | Uchibori | B60L 53/67 318/568.1 |
| 8,915,341 | B2 * | 12/2014 | Schmiedle | B60L 5/12 191/50 |
| 8,932,072 | B2 * | 1/2015 | Tamaki | B62J 43/16 439/345 |
| 9,266,440 | B2 * | 2/2016 | Gao | B60L 53/16 |
| 9,620,896 | B1 | 4/2017 | Dubbaka | |
| 10,179,721 | B2 * | 1/2019 | Teruzzi | H01R 13/6205 |
| 2010/0096157 | A1 * | 4/2010 | Diening | H02G 3/185 174/53 |
| 2013/0076902 | A1 | 3/2013 | Gao et al. | |
| 2018/0208443 | A1 * | 7/2018 | Hermey | B66C 13/12 |
| 2019/0267758 | A1 * | 8/2019 | Jung | B60L 50/60 |

FOREIGN PATENT DOCUMENTS

| | | | |
|---|---|---|---|
| CN | 200943022 Y | 9/2007 | |
| CN | 201525705 U | 7/2010 | |
| CN | 202042764 U | 11/2011 | |
| CN | 202142764 U * | 2/2012 | |
| CN | 202142764 U | 2/2012 | |
| CN | 105073623 A | 11/2015 | |
| CN | 205634666 U | 10/2016 | |
| DE | 3815033 C1 | 7/1989 | |
| DE | 202006009750 U1 | 10/2007 | |
| DE | 102008024572 A1 | 11/2009 | |
| DE | 10 2011 002334 A1 | 10/2012 | |
| DE | 202015004918 U1 | 10/2016 | |
| DE | 102016223051 A1 * | 5/2018 | ............. B25J 9/042 |
| WO | 2014/131826 A1 | 9/2014 | |

OTHER PUBLICATIONS

Written Opinion for PCT/EP2018/061359 filed May 3, 2018.
Result of examination report for German Patent No. 10 2017 109 988.3 dated May 9, 2017.
First Office Action for related Chinese Patent Appl. No. 201880004259.X dated Dec. 24, 2019 with partial English translation (17 pages).
International Preliminary Report on Patentability, dated Nov. 12, 2019, with Written Opinion (English translation) for PCT/EP2018/061359, filed May 3, 2018.

* cited by examiner

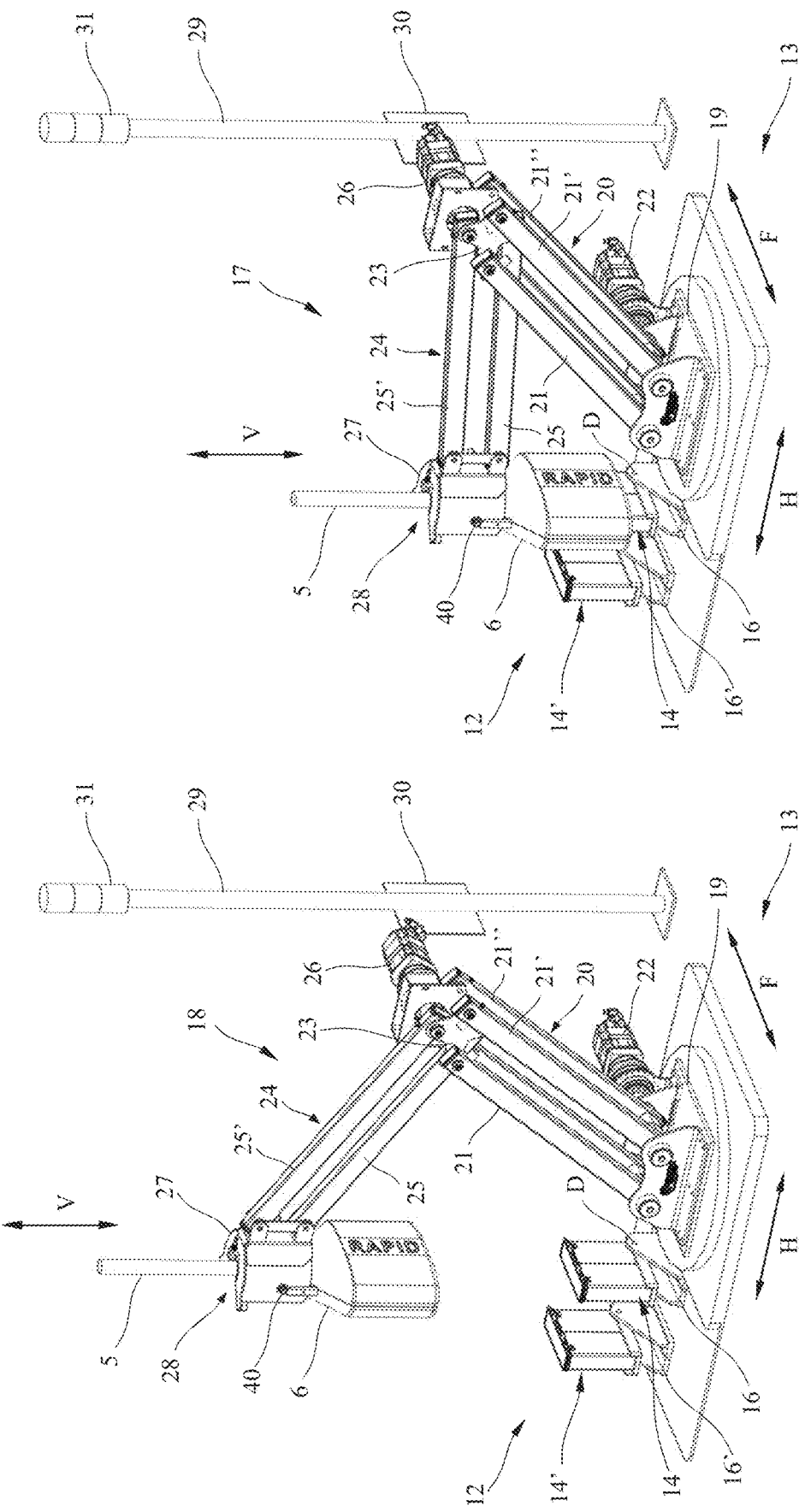

CONNECTION DEVICE, POWER SUPPLY SYSTEM AND METHOD FOR CONNECTION OF A LINE CABLE TO THE CONNECTION DEVICE

FIELD OF THE INVENTION

The invention concerns a connection device, a power supply system and a method for connection of a line cable to the connection device.

BACKGROUND

A container-loading crane is known from DE 20 2006 009 750 U1 on which a line cable drum is provided for winding and unwinding of a line cable. The line cable is connected to a fixed feed location, relative to which the loading crane travels in a longitudinal direction. Depending on the travel position, the line cable is wound up or unwound by the line cable drum. This has the drawback that the line crane is firmly connected to a travel route along which it moves forward and backward in the longitudinal direction. Cranes have therefore long been mounted on rails and connected to a fixed feed location.

Since cranes are increasingly supposed to travel not only along a single container stacking location but also between different stacking locations offset relative to each other laterally and in the longitudinal direction, they can no longer be connected to a fixed single feed location assigned to the corresponding container stacking location. Instead they must be connectable flexibly with different feed locations.

To make this possible WO 2014/131826 A1 proposes a device for automatic connection of a crane to an electrical power supply, in which case the connection line carried on the crane is provided on the end with a plug that is inserted into a docking station positioned in a hole in the ground. The docking station then has two vertical rods spaced from each other into guide openings of the plug when the plug is introduced to the docking station. Automatic locking in the hole in the ground is also provided there in order to fix the plug on the docking station.

The line cable protrudes vertically upward from the docking station and is then paid out on the ground in the longitudinal direction next to the crane when the crane is moved farther from the docking station. The line cable must then be bent as uniformly as possible and a minimal bending radius of the line cable must be maintained. Tension relief is also provided so as not to damage the electrical wires guided in the line cable when it is pulled out or rolled up. A line cable carrying assembly is therefore additionally included in the known device, around which the line cable coming from the plug in the ground is positioned. The line cable carrying assembly is set down together with the plug on the docking station. This has the shortcoming that either a human operator must position the line cable around the line cable carrying assembly or the line cable must already be wound onto it beforehand. The line cable assembly is also costly and large and heavy in design so that the device for positioning and accommodating the plug and the line cable carrying assembly must be designed so as to be sufficiently robust and have a powerful drive. The entire arrangement to be carried on the crane is also heavy and therefore increases the weight of the crane so that its drive must be designed so as to be stronger. This arrangement is also large in design so that it requires considerable space on the crane and increases the width of the crane.

US 2013/0076902 A2 discloses a robotic loading station for loading a battery of an electric vehicle, comprising a base plate, a post coupled to the base plate that extends essentially perpendicular to the base plate, and a robotic arm. The robotic arm extends from the post and carries a gripping device. The gripping device includes a number of electrical contacts that are configured in order to be connected to a receptacle arranged on the electric vehicle. The robotic arm is designed so that it moves the gripping device in three directions of movement.

DE 38 15 033 C1 discloses a device for remote coupling of a plug connection that operates by means of a crane. A first plug part is mounted on a crane hook block. A second plug part that is connected to a current consumer via a cable is secured in an amount that ensures vertical alignment of the plug part and takes up the reaction forces during coupling and decoupling. Using movement in a horizontal plane the plug part is removed from the mount, whereupon the crane hook engages an eye of the equipment.

U.S. Pat. No. 9,620,896 B1 discloses a two-sided electrical connection system that automatically connects two connector sides to each other. A male side and a female side of the connector have bodies shaped so that the male side can be automatically accommodated by the female side through gravity. The guide structure around the female side of the two-sided connector makes it possible for the male side to be guided into position without perfect alignment of the two sides of the connector being necessary.

CN 202142764 U concerns the technical field of a power supply of a wheeled crane in a dock storage facility and especially an automatic connection device of the cable drum of the wheeled crane in container storage facilities. The power supply can occur without worker intervention, for which purpose an automatic connection switching device includes a power supply connection system, a cable, which is connected to the wheeled crane, a cable plug on the rear end of the cable and a cable plug movement device that is fastened to the wheeled crane.

DE 20 2015 004 918 U1 discloses a coupling unit for coupling of a freely movable device to a power chain system, in which electrical lines, light guides or hoses can be temporarily connected to each other via plug parts, the energy chain system being firmly connected to a coupling cart that has a first plug part that can be connected to a second plug part arranged on a tension-resistant hose, cable or link chain of the device and can be moved parallel to the travel direction of the device. The coupling unit is then extendable with the second plug part in the direction toward the coupling cart so that the two plug parts can be positioned horizontally and vertically relative to each other and connected to each other and the coupling unit can be moved back after connection of the two plug parts so that the device and the coupling part are connected so as to be tension-resistant and flexibly to each other via the tension-resistant hose and the cable or link chain.

SUMMARY OF THE INVENTION

One aspect of the disclosure relates to a simplify automatic connection of a line cable to a feed device arranged on the ground that eliminates the aforementioned drawbacks. Mild guiding and positioning of the line cable is also preferably made possible, especially so as to avoid the hazard of kinking or unduly sharp bending of the line cable produced during travel of the electrical load.

The invention solves this task through relates to a connection device, a power supply system and a method for connection of a line cable using the connection device. Advantageous modifications and embodiments of the invention are also disclosed.

A connection device mentioned in the introduction is characterized according to the invention in that the connection device has a manipulator for connection of a connector to the connection. The manipulator can then be movable in at least one horizontal feed direction and/or vertical feed direction for grasping and guiding of the line cable and/or the connector. The manipulator can preferably be rotatable around a vertical axis.

The manipulator can preferably have a gripping device for gripping of the line cable and/or connector. In particular, the gripping device can have a funnel-shaped introduction opening for the line cable and/or the connector. The gripping device can preferably have a locking device for releasable holding of the line cable and/or connector on the gripping device.

The connection device can also have a guide that keeps the gripping device at a roughly equivalent slope angle relative to the connection during movement of the manipulator. The manipulator can preferably have a lower manipulator arm and an upper manipulator arm, at least one of them being designed as a parallelogram guide.

A power supply system mentioned in the introduction is characterized according to the invention in that a connection device according to the invention described above and subsequently is provided. The reservoir can preferably be a motor-driven cable drum, in which case the line cable is advantageously only wound up cumulatively but not side-by-side. A laying direction of the line cable can also advantageously run from the feed device to an outlet of the line cable from a cable guide arranged on the load, in which case the travel direction and laying direction advantageously only deviate slightly from each other, especially by no more than 15°.

In an advantageous embodiment the connection can be rotatable around at least one pivot axis. The pivot axis especially can run across the travel direction or across the laying direction of the line cable running from the feed device to the movable load. The pivot axis can also run essentially parallel to a base provided for laying of the line cable, i.e., in the horizontal direction. The connection can also be pivotable around an additional pivot axis running essentially perpendicular to a base provided for laying of the line cable. A pivot angle around the at least one pivot axis can also advantageously amount to at most 225°, preferably at most 190° and especially preferably at most 160°.

The feed device can preferably have a holding device to hold the connection in a rest position. The line cable can then also advantageously protrude upward in the rest position. With particular advantage the connection can be pivoted out in both directions of rotation of the pivot axis from the rest position so that the load can travel past the feed device. A return device can advantageously be provided in order to move the connection back to the rest position from a position pivoted out from the rest position, in which case a connection lock can be provided to lock the connection in the rest position. A plug lock to lock the connector can also advantageously be provided on the connection in order to prevent undesired loosening of the connector during power and/or data transmission.

A positioning element assigned to the connection device or the feed device and especially arranged thereon can advantageously be provided, which is detectable by a sensor unit arranged on the load. Positioning of the movable load relative to the connection device and especially relative to the manipulator can be simplified on this account so that the manipulator can reliably and quickly grasp the line cable and/or the connector. The arrangement of the positioning element and the sensor unit can also optionally be exchanged so that the positioning element is arranged on the load and the sensor unit on the connection device or feed device.

The positioning element can then preferably have a QR code and/or at least one reflecting area for detection by the sensor unit. The positioning element can also have reflecting areas and/or areas having different reflection properties offset relative to each other in the travel direction of the load. The reflecting areas and/or the areas having different reflection properties can also advantageously be offset relative to each other across the travel direction, especially in the horizontal feed direction of the manipulator. In a preferred embodiment, the positioning element can have a forward central area especially in a horizontal feed direction of the manipulator and at least one edge area following it in the travel direction offset rearward and/or frontward relative to the central area in the horizontal feed direction.

The sensor unit can also advantageously be set up in order to detect the at least one reflecting area and/or set up for distance measurement.

A method mentioned in the introduction for connection of a line cable arranged on an electrical load, especially a loading crane, to a feed device is characterized according to the invention by the steps a) positioning of a connector of the line cable relative to the feed device, b) gripping of the connector and/or the line cable by a manipulator of a connection device preferably arranged on the feed device, c) connection of the connector to a connection of the feed device by means of the manipulator.

BRIEF DESCRIPTION OF THE DRAWINGS

The invention is described below by means of detailed practical examples with reference to the accompanying drawings. In these drawings:

FIG. 3 shows a schematic three-dimensional view of a manipulator arm of the connection device from FIG. 2 during grasping of a connection plug;

FIG. 4 shows the manipulator arm from FIG. 3 during connection of the connection plug to a plug connection of a feed device;

DETAILED DESCRIPTION OF THE INVENTION

Figure 1:
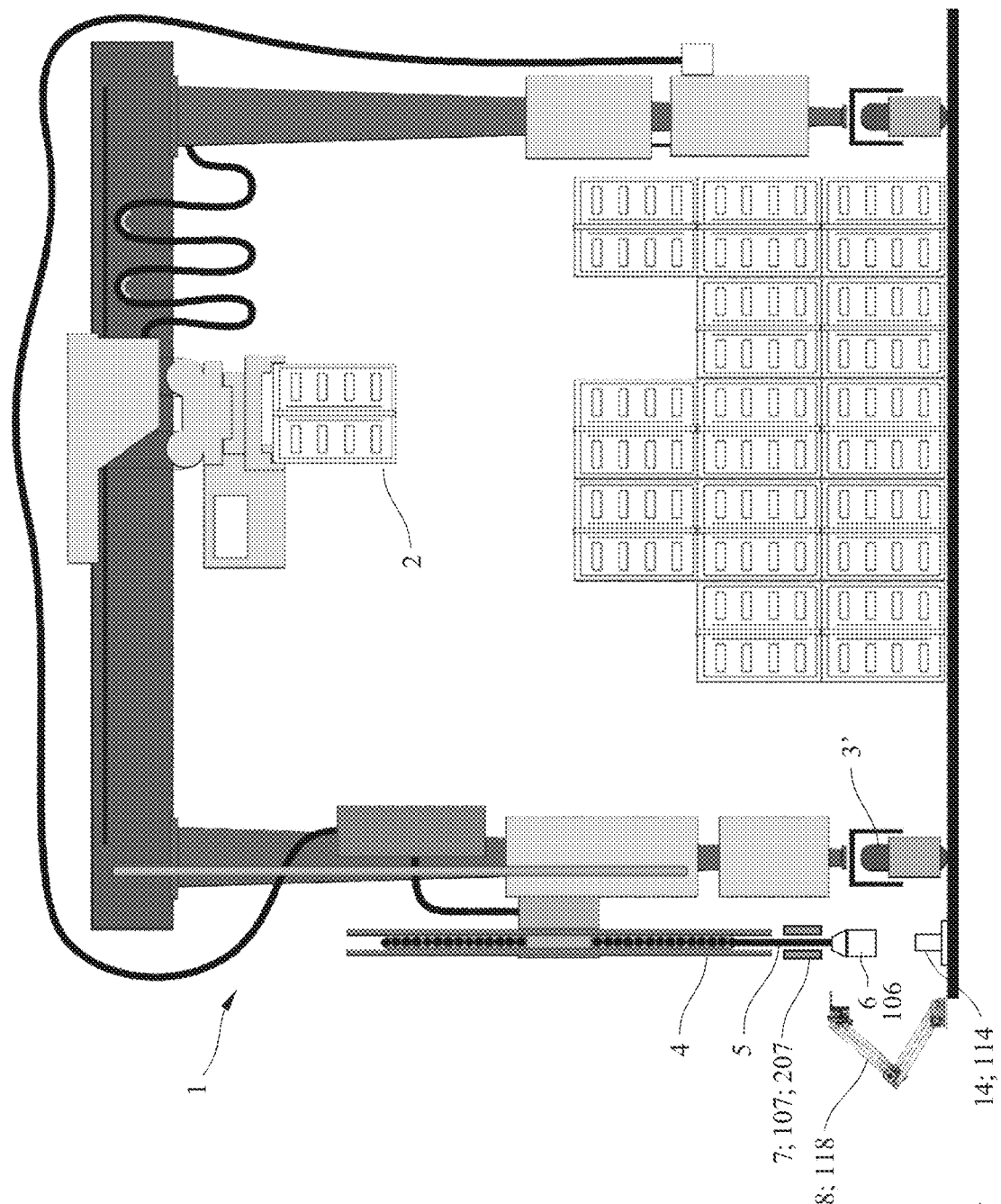
FIG. 1 shows a schematic side view of a power supply system for a container crane.

A known crane 1 for movement of the containers 2 located at a container stacking site is shown in FIG. 1, as used at large transshipment facilities, especially in harbors. The crane 1 can travel on wheels 3, 3' in a travel direction F in a driving lane next to the container stacking site, which generally runs parallel to the positioned containers 2. Generally, several such container stacking locations are arranged next to one another and possibly also behind one another at transshipment facilities, in which the crane 1 and also other cranes can move among the individual container stacking sites.

In order to supply electrical power to the crane 1 and the electrical systems installed on it, for example, the motors for lifting and moving the containers 2 and the electric drives of the wheels 3, 3', and/or to transmit data from and to the crane 1, a line cable drum 4 is arranged on the outside of the crane 1, from which an electrical line cable 5 can be wound up and unwound in a laying direction, corresponding to the travel path of the crane 1 in the travel direction F. Ordinarily the laying direction and the travel direction F coincide or at most deviate slightly from each other, since the line cable 5 is preferably laid parallel to the travel direction F. Laying of the line cable 5 then occurs according to the movement path of claim 1, which ordinarily also slightly deviates from the ideal line running parallel to the containers 2 over the length of the movement path. In this respect "parallel" here and subsequently does not mean exact mathematical parallelism at each point of the movement path, but that the line cable 5 is laid next to the container stacking site in the context of movement and laying inaccuracies. The above is known per se.

On the free downward hanging end the line cable 5 has a connector designed as a connection plug 6 or 106, which can be properly guided as free of stress as possible by means of a cable guide device 7 or 107 arranged on the crane 1 for laying on the ground and also for retrieval in the cable drum 4.

Figure 2:
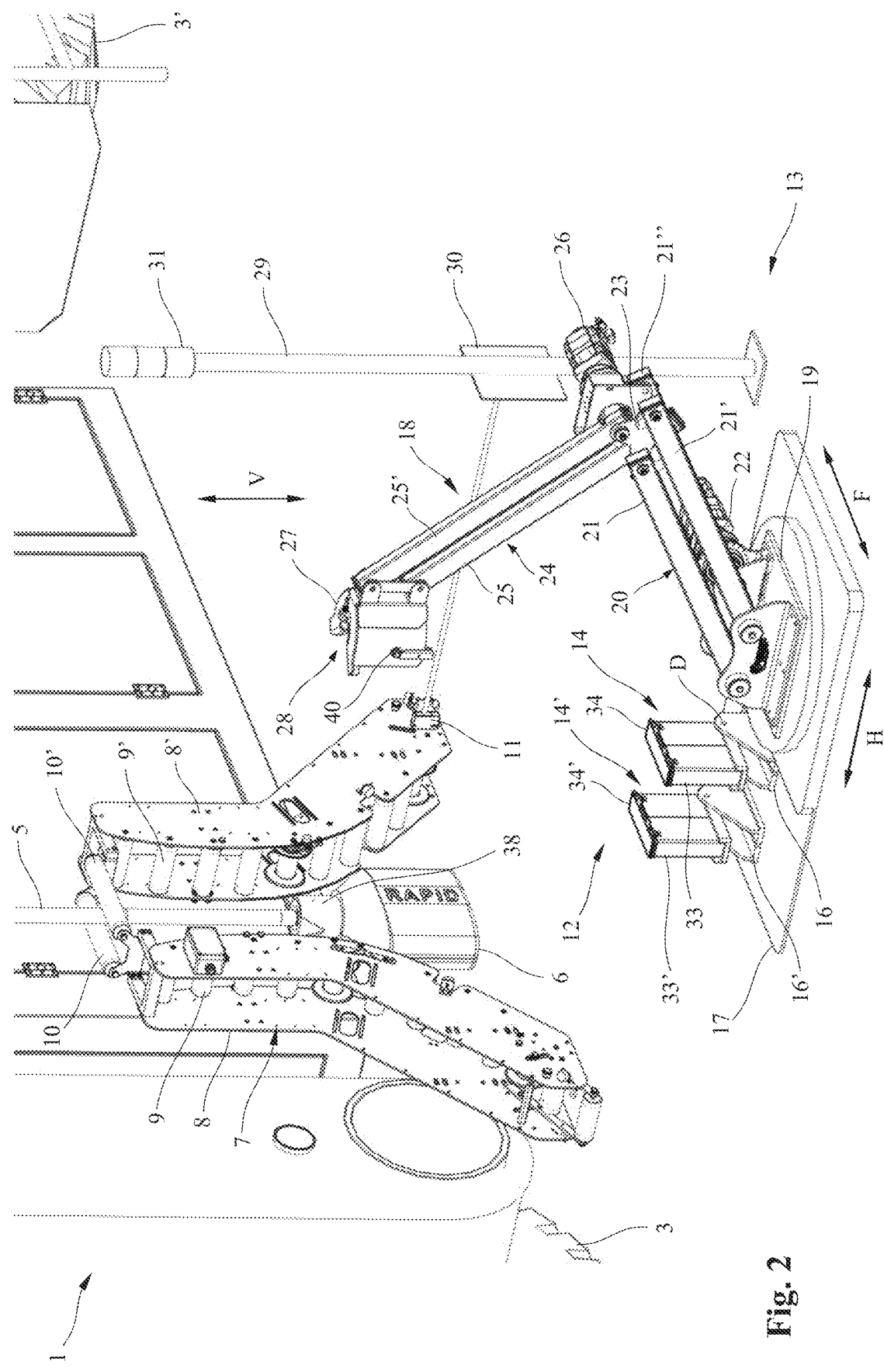
FIG. 2 shows a schematic three-dimensional view of a cutout from FIG. 1 with a first connection device according to the invention.

In the detailed schematic three-dimensional view of a first practical example in FIG. 2 a cutout of the crane 1 and the wheels 3, 3' is shown obliquely from the side. The cable guide device 7 is also shown there in detail, with which the line cable 5 can be properly laid on the ground with the least possible force and stress input. The cable guide device 7 has two downward widening roller bends 8, 8' opposite each other and offset in the travel direction F of the crane 1. A number of freely rotatable longitudinal guide rollers 9, 9' are provided in the roller bends 8, 8', on which the line cable 5 can be guided with the least possible friction. In the lateral direction H across the travel direction F, guiding of the line cable 5 occurs by means of two side guide rollers 10, 10', which are arranged above the roller bends 8, 8' and connect them in the present practical example, which, however, is not necessary. A sensor unit 11 is arranged on the lower end on the right roller bend 8' in FIG. 2, whose function is explained later. However, the sensor 11 could also be arranged on a location of the cable guide device 7 or also on the crane 1 and could also be connected in wireless fashion to the control.

For connection of the connection plug 6 to an electrical power supply not shown in detail, a fixed feed device 12 is provided next to the driving lane of the container crane 1 having a connection device 13 arranged there. The feed device 12 in the present case has two connections designed as plug connections 14, 14', which are linked rotatably on bearings 16, 16' by means of two connection parts designed as pivot plates 15, 15' around pivot axes designed as axes of rotation D, D' (see FIG. 7). The bearings 16, 16' are fastened on the bottom or on a fastening element mounted on the bottom, especially a fastening plate 17, which in turn is ordinarily fastened to a fixed foundation. The function of the rotatable bearing is described in detail later with reference to FIG. 7. However, more or fewer plug connections can also be provided on the feed device.

The connection device 13 has a manipulator 18, which is designed for gripping and active movement of the connection plug 6 and to produce a connection of the connection plug 6 to the plug connection 14. The manipulator 18 has a manipulator base 19, on which a lower manipulator arm 20 with four lower partial arms 21, 21', 21" is linked, two of which are fully visible and one of which is partially concealed in FIGS. 2 to 6. The manipulator arm 20 can be moved via a lower manipulator drive 22, which rotates the partial arm 21" and preferably also the partial arm 21'.

On its other upper end, the lower four partial arms 21, 21', 21" are then connected with a cross-like connection piece 23 so that the partial arms 21, 21', 21" form a first parallelogram guide. An upper manipulator arm 24 is also connected to it, which is linked rotatably with two upper manipulator arms 25, 25' to two other joint connections of the connection piece 23 offset cross-like to the joint connections of the roller partial arms 21, 21', 21". On their front upper ends the manipulator arms 25, 25' are again connected to each other parallelogram-like. The upper partial arm 25' can be rotated around its lower pivot axes via an upper manipulator drive 26.

On its front upper end, the upper manipulator arm 24 is equipped with a gripping device 27 for the connection plug 6 in order to be able to position the connection plug 6 properly relative to the plug connection 14 by means of the manipulator 18 only movable in the horizontal feed direction H and the vertical feed direction V. The gripping device 27 has a funnel-like introduction opening 28, in order to be able to reliably grip and move the connection plug 6, as shown in FIG. 4. This is explained in further detail later.

In order to be able to position the connection plug 6 relative to the manipulator 18 only movable in the horizontal feed direction H across the travel direction F of the crane 1 so that the gripping device 27 can reliably grip the connection plug 6, a signal mast 29 is mounted next to the connection device 13. The signal mast 29 has a positioning element designed as an identifying plate 30. The sensor unit 11 arranged on the right lower end of the roller bend 8 in FIG. 2 detects whether the identifying plate 30 is situated relative to the sensor unit 11 in a position in which the manipulator 18 can grip the connection plug 6. If yes, the gripping process is initiated by the manipulator 18, which can compensate for different distances in the horizontal feed direction H within a certain range.

For example, it can be checked for this purpose whether or not the identifying plate 30 is situated in the measurement range of the sensor unit 11. The identifying plate 30 can have a large-surface QR code and the sensor unit 11 a very narrow measurement range within which the QR code must lie. As an alternative or in addition, the identifying plate 30 can also have a reflector film having known dimensions and position, in which case the distance to it is then preferably measured using the sensor unit 11. As soon as the beginning of the reflector film is detected, the position of the crane 1 and the cable guide device 7 relative to the manipulator 18 can be determined from the known dimensions. The distance measurement can also be used to enable grasping by the manipulator 18 of the connection plug 6 rapidly and with the most precise spacing possible.

Since the insertion opening 28 is funnel-shaped, a certain offset of the connection plug 6 in the travel direction F can also be compensated in the event of not entirely precise positioning of the crane 1 relative to the insertion opening 28.

In order to inform the driver or operating personnel of the crane 1 of proper positioning and optionally reliably produced connection between the connection plug 6 and the plug connection 14, a signal light 31 having the conventional traffic signal colors of red, yellow and green is mounted visibly on the upper end of the signal mast 29. Red then signals that no connection has yet been made, yellow signals production of the connection and green the produced connection and withdrawal of the manipulator 18, i.e., release for further travel. However, other colors or light signals, such as slow and rapid blinking, etc. can also be used. As an alternative, it can also be indicated to the driver by means of the signal light 31 whether or not a plug connection 14, 14' is still free on the feed device 12: red then indicates no free plug connection and green a free plug connection, whereas yellow indicates that a connection is being made on the feed device.

The process of gripping and connection of the connection plug 6 to the plug connection 14 is described subsequently as an example with reference to FIGS. 3 to 6.

The crane 1 in FIG. 3 has been already moved into the favorable position with respect to the connection device 13 and the manipulator arm 18 has already grasped the connection plug 6 with the gripping device 27. The manipulator 18 with the gripping device 27 travels beforehand to the line cable 5 above the connection plug 6 and encloses it. The gripping device 27 then travels from above over an upper cylindrical gripping part 38 of the connection plug 6 to a stop at the bottom until a gripping stop fastens the connection plug 6 on the gripping device 27.

The gripping part 38 has a centering funnel 39 readily apparent in FIG. 2, in which centering mandrels 40 arranged opposite each other engage in the funnel-like insertion opening 28. The centering mandrel 40 indicated in its position on the outside on gripping device 27 is depicted in FIG. 2. Because of this a situation can advantageously be achieved in that the connection plug 6 held by the gripping device 27 is aligned so that it can be properly mounted on one of the plug connections 14, 14'.

Figure 6:
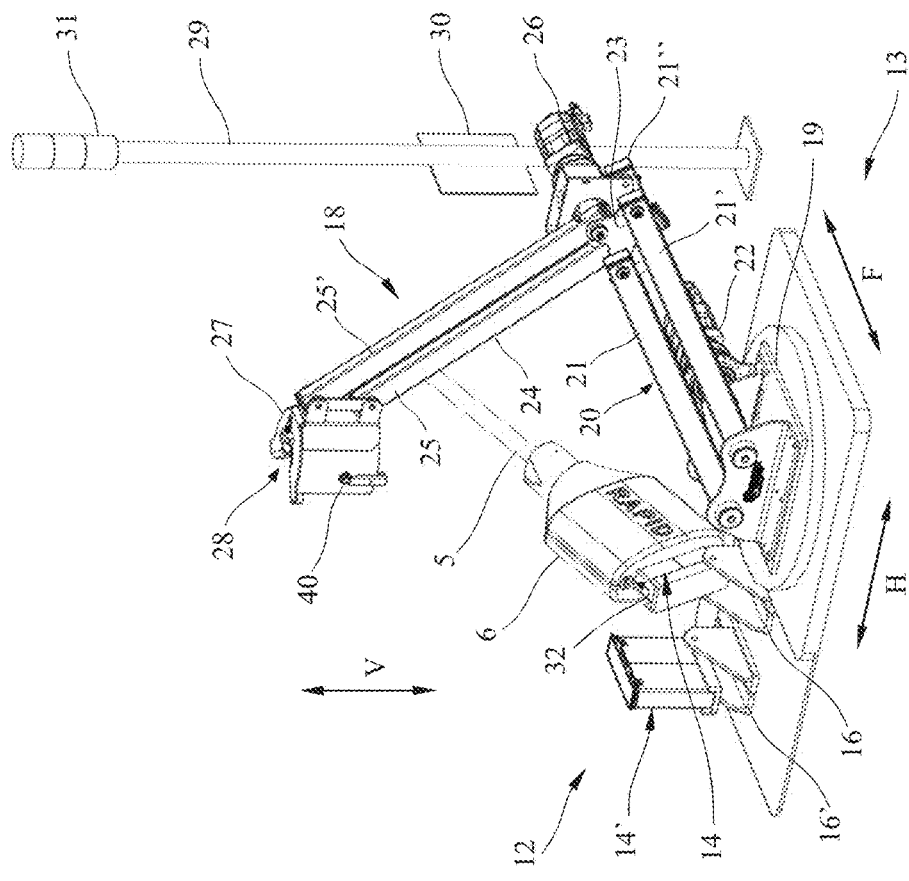
FIG. 6 shows the view from FIG. 5 with the plug connection pivoted from the rest position by movement of the crane.

The manipulator 18, as shown in FIG. 3, by rotation of the upper manipulator arm drive 26 and optionally the lower manipulator arm drive 22, then moves the connection plug 6 over the plug connection 14 so that a connection plug opening 32 of the connection plug 6 recognizable only in FIG. 6 is flush with the outside contour of the plug connection 14. The connection plug 6 is then pushed over the plug connection 12 by means of the manipulator 18 and releasably connected with a plug lock not shown in detail here and further described later in detail, as is recognizable in FIG. 4. An electrical connection between an electrical power supply of the container stacking site connected to the plug connection 14 and the connection plug 6 of the crane 1 and therefore its electrical supply network is then produced via the plug connection 14. A data connection, for example, an electrical or optical data transmission, can also be produced, for example, by providing releasable plug connections.

Through the double parallelogram guiding of the manipulator 18 it can then be advantageously ensured that the gripping device 27 does not alter its slope angle with reference to the plug connection 14 during its movement. The connection plug 6 moved by the gripping device 27 is therefore not tilted from the ideal position depicted in the drawing so that the line cable 5 is not bent very strongly or even kinked. Instead of parallelogram guiding, the manipulator 18, however, can also be configured differently in order to secure it, for example, by using a robot having at least one robotic arm and a gripping device arranged on it or in some other manner familiar to one skilled in the art. For example, two linear telescopic arms or extensions, one horizontal and one vertical, can also be used.

Figure 5:
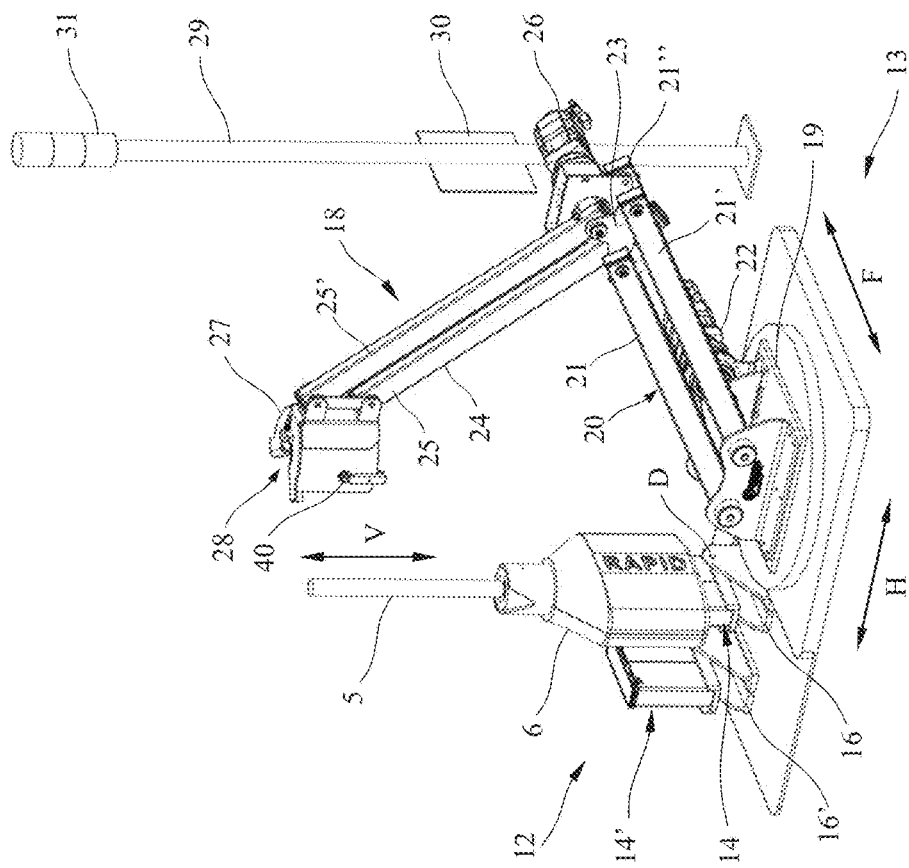
FIG. 5 shows the manipulator arm from FIG. 3 in a withdrawn position after loosening of the connection plug.

As shown in FIG. 5, the gripping lock of the gripping device 27 is then released and the manipulator 18 moved away from the crane 1 by rotation of the manipulator arm drives 22, 26 from the line cable 5 and the connection plug 6 according to FIG. 5 on the right. It is then indicated by the signal lights 31 for the operating personnel of the crane 1 that the connection between the connection plug 6 and the plug connection 14 has been made and the manipulator 18 is free and the crane 1 can therefore move away from the connection device 13 and assume its normal operation. In the present practical example, the connection device 13 is arranged at the entry of a driving lane for the crane 1 so that travel along the container stacking site in FIGS. 2 to 6 occurs obliquely to the top right. The connection device 13, however, can also be arranged at another location.

As is known from the prior art, it is important for the longest possible lifetime of the line cable 5 that it is bent beyond the admissible minimal bending radius as seldom as possible and best if not at all, let alone fully kinked.

An aspect of the present invention therefore is the task of permitting improved guiding of the line cable 5 connected to a feed device and especially of reducing the hazard of kinking or unduly sharp bending of the line cable 5 during movement of the electrical load, especially for the crane 1.

Figure 7:
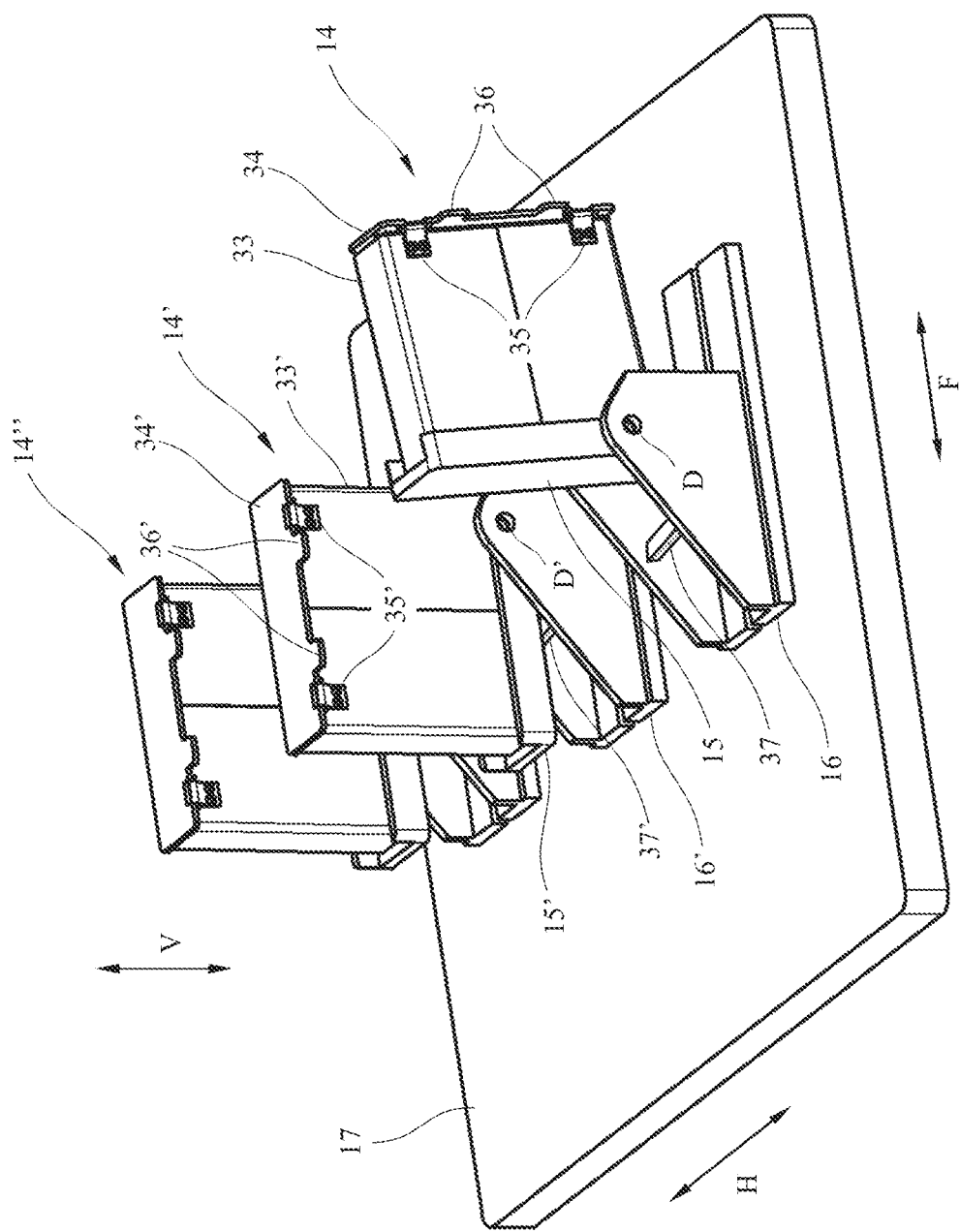
FIG. 7 shows a detailed view of part of the feed device from FIGS. 2 to 6.

For this purpose, as is readily apparent in FIGS. 6 and 7, the invention proposes that the plug connections 14, 14' are arranged rotatable around an axis of rotation D or D' running across the travel direction F and preferably parallel to the ground. If the crane 1 having the line cable 5 then travels from the connection position to the right in FIG. 2 in the travel direction F, as shown in FIG. 6, the line cable 5 is not curved or hardly bent or kinked because of the plug connection 14 pivotable in the travel direction F but runs essentially straight from the plug connection 14 and in the pulling direction of the line cable 5 to the cable guide device 7. If the crane 1 then moves farther from the feed device 12 and the connection device 13, the line cable 5 is laid bit by bit in known fashion next to the travel route of the crane 1. In contrast to the prior art, however, in the present embodiment, the plug connection 14 is tilted to the extent that the connection plug 6 is sloped slightly downward and the line cable 5 is laid on the ground coming from the connection plug 6 with almost no or only slight bending.

The line cable 5 during the entire laying process is therefore only slightly bent so that mild line guiding is made possible, the lifetime of the line cable 5 is lengthened and the reliability of the system is therefore increased.

Use of the rotational functionality of the plug connection 14 depicted in the drawings and described above is also possible in systems having permanent connection of the line cable 5 to the feed device 12 so that even then the advantages of improved line cable guiding are obtained.

The detail of the connection device 13 shown in FIG. 7 shows an additional plug connection 14'', which corresponds in function, however, precisely to the plug connection 14, 14'. Since these are identically designed, the invention is preferably explained below with reference to a plug connection 14. The two other plug connections 14', 14'' and their parts are denoted using the corresponding reference numbers as in plug connection 14, if necessary supplemented by one or two apostrophes.

The plug connection 14 has a plug connection housing 33, in which the electrical connection elements for an electrical power connection and/or a data connection (not visible) are arranged.

In order to avoid penetration of moisture, dust, water, rain, etc. from above onto the electrical connection elements, the plug connection housing 33 in its rest state depicted in FIG. 2 has a cover 34 on the upper end, which is joined rotatably to the plug connection housing 33 via a pair of hinges 35. The cover 34 is held in the closed position under the action of a spring in known fashion and moved back from an open position to the closed position.

In order to be able to automatically open the cover 34 during positioning or mounting of the connection plug 6, opening tabs 36 connected to the cover 34 are provided on the side of the hinge 35 extending outward above the plug connection housing 33. The corresponding stop in the connection plug 6, especially the corresponding edge of the connection plug opening 32, forces the opening tabs 36 downward to the plug connection housing 33 when the connection plug 6 is positioned and inserted so that the cover 34 moves upward. The electrical connection elements of the plug connection 14 are released by this action. The connection plug 6 is then moved further downward and the male electrical and/or data connection elements situated in the connection plug 6 can be connected to the corresponding elements, here female connection elements, in the plug connection housing 33 protected against external influences, like wind, water, rain, etc. Cover 34 also prevents operating personnel or unauthorized persons from gaining direct and unprotected access to the connection elements, especially the electrical connection elements.

In order to keep the pivot plate 15 and therefore the plug connection 14 in the rest position depicted in FIGS. 2 to 5, a stop 37 depicted in FIG. 7 can be provided on the bearing 16 for the pivot plate 15. The plug connection 14 in the depicted embodiment then remains in the rest position as a function of weight. In an advantageous embodiment (not shown), a spring force can also act on the pivot plate 15 in order to return the plug connection 14 to its rest position when it is not connected to the connection plate 6.

In an alternative embodiment of the connection device 13, which can also preferably be arranged along a travel route of the crane 1, the plug connections 14, 14' are advantageously designed so that they can rotate in the direction of the travel direction F around the axis of rotation D preferably arranged in the center, i.e., laying of the line cable 5 both on one side and the other side of the plug connections 14, 14' can occur. A retaining device is also advantageously provided here, which ensures the unconnected plug connection advantageously faces upward in a direction favorable for connection of the connection plate 6. The plug connection 14 can then be preferably locked against the bottom plate 17 until the connection plug 6 is securely connected to the plug connection 14. Such an embodiment as described later is self-evident to one skilled in the art.

FIGS. 8 to 28 show alternative embodiments of parts of the power transmission system depicted in principle in FIG. 1, especially with the modified feed device 112, the connection device 113 and the cable guide device 107. Since these parts are designed the same or similarly as in the embodiment depicted in FIGS. 2 to 7, corresponding parts having corresponding reference numbers, each supplemented by the number "100", are used. Mostly the differences are also taken up so that comments concerning corresponding parts in the first embodiment according to FIGS. 2 to 7 also apply accordingly to the alternative embodiments of FIGS. 8 to 28 and vice versa, unless otherwise stated.

Figure 8:
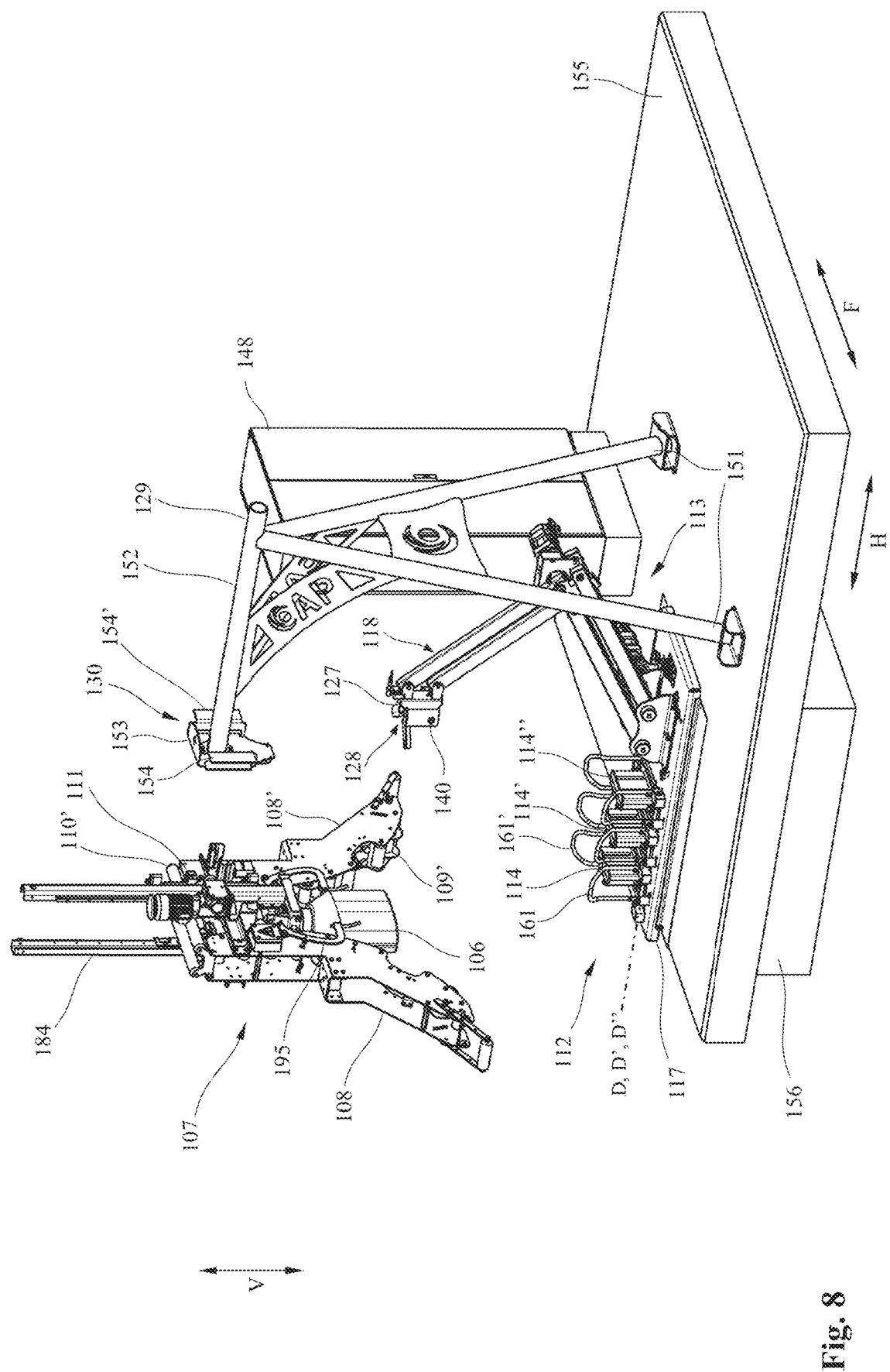
FIG. 8 shows a schematic three-dimensional view of a cutout from FIG. 1 with an alternatively configured second connection device according to the invention for gripping of a connection plug.
Figure 16:
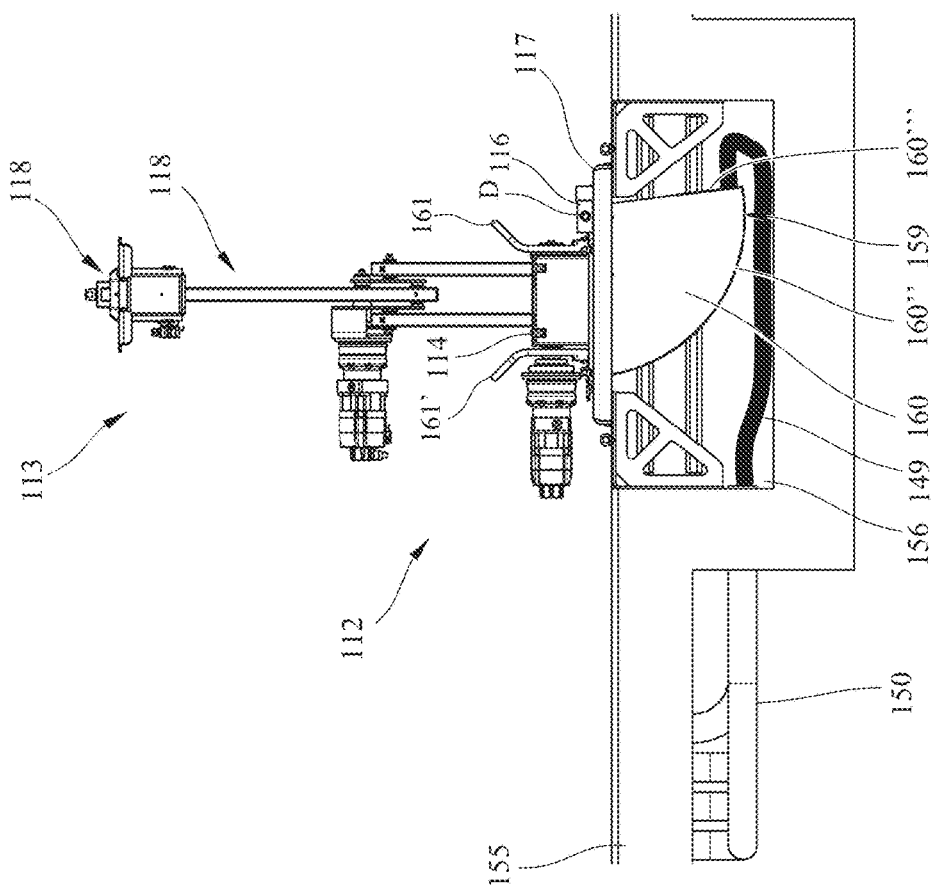
FIG. 16 shows a side view of the partially cut out depiction of the feed device and the connection device from FIG. 14 from the top left in FIG. 14.

A switchbox 148 is also shown in the feed device 112 depicted in FIG. 8, in which the electrical power supply unit is located and to which the supply and data cables 149 indicated in FIG. 16 lead, which pass through cable lead-throughs 150, 150', 150'' (see FIGS. 16 to 18) in the switchbox 148.

The method of function of the power transmission system depicted in FIGS. 8 to 13 corresponds in principle to that shown in FIGS. 2 to 7. The line cable 5 in FIG. 8 with a connection plug 106 is again positioned relative to the manipulator 118 so that a gripping device 127 can grip the connection plug 106 during movement in the horizontal feed direction H. The connection plug 106 is then released somewhat so that the manipulator 118 can grasp it in the manner described above with the gripping device 127 and bring it into the position provided for mounting on the plug connection 114. The plug connection 114 is designed like the plug connection 14 and in particular has a plug connection housing with a movable cover.

Figure 9:
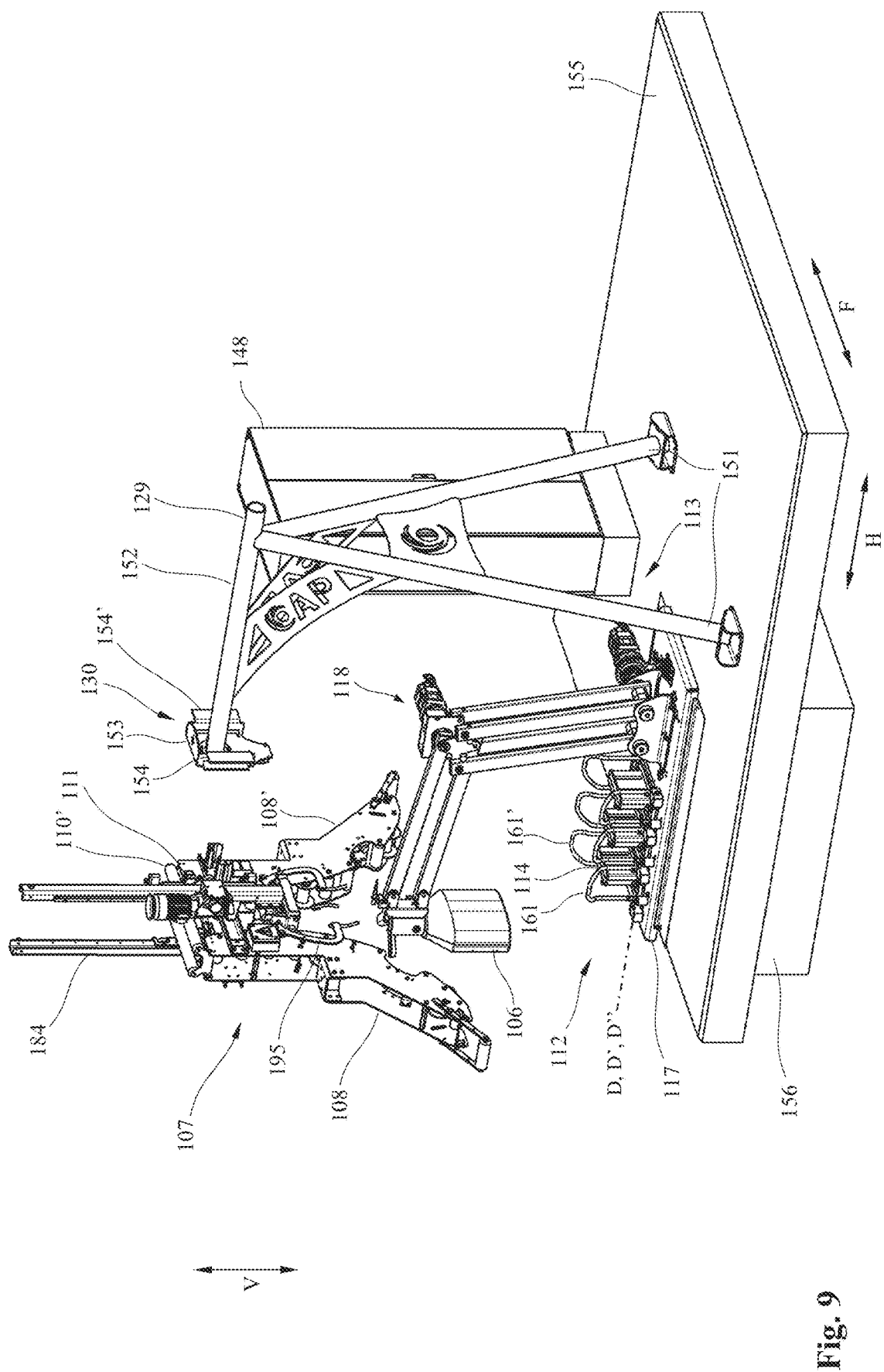
FIG. 9 shows a schematic three-dimensional view of the manipulator arm of the connection device from FIG. 8 during gripping of the connection plug.
Figure 10:
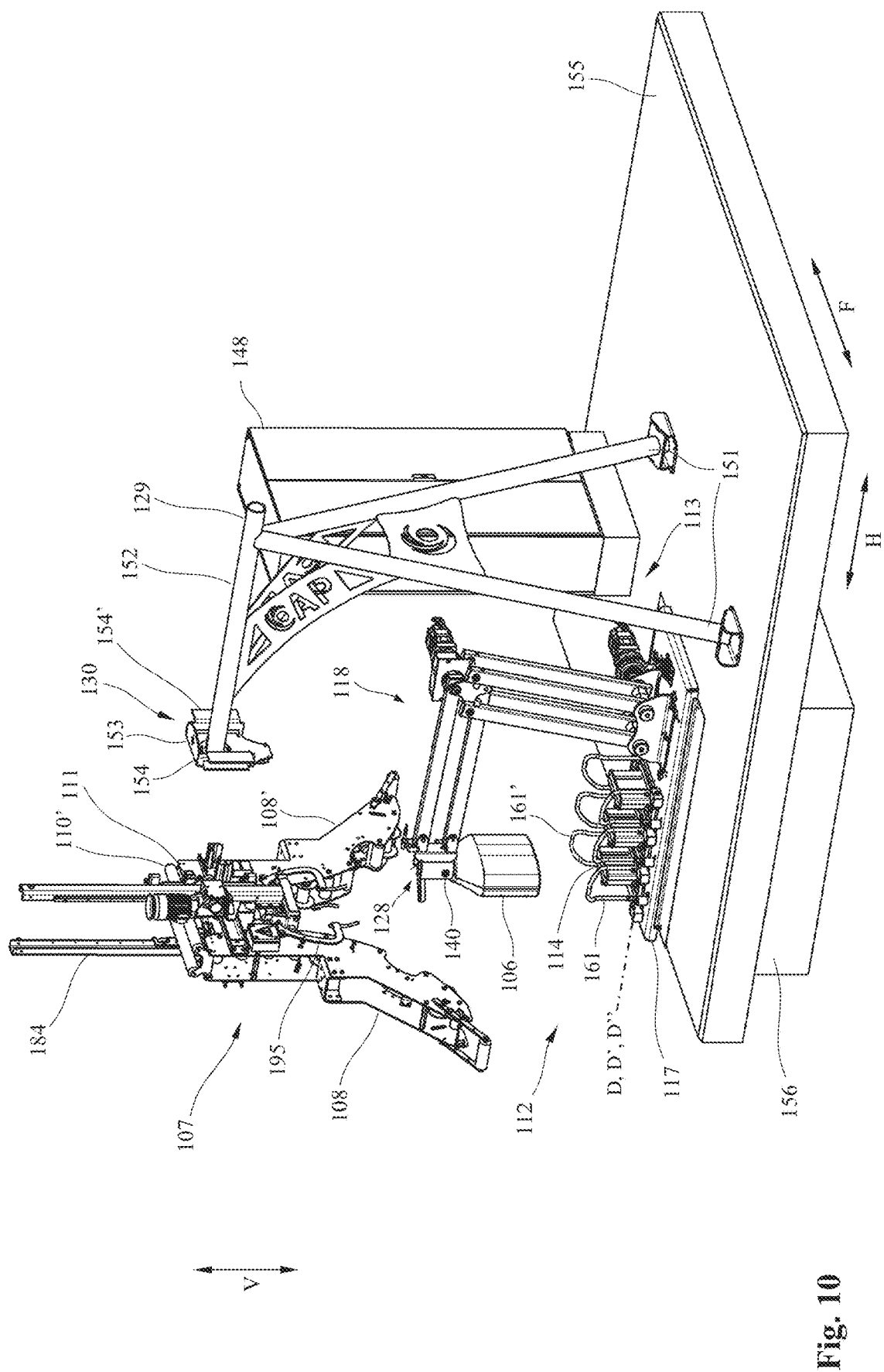
FIG. 10 shows the view from FIG. 9 with the manipulator arm from FIG. 9 during supply of the connection plug to a plug connection of the feed device.
Figure 11:
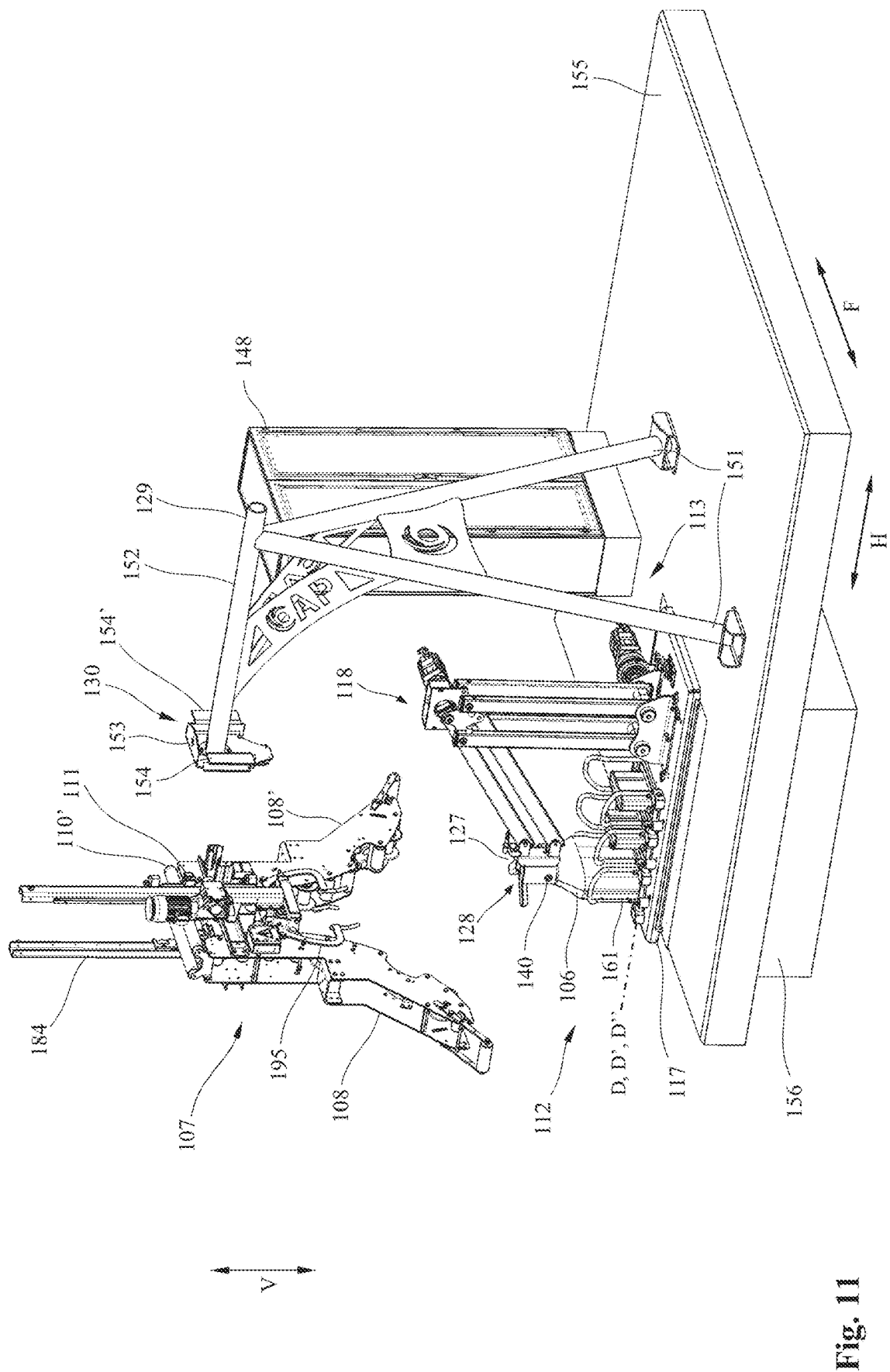
FIG. 11 shows the view from FIG. 9 with the manipulator arm from FIG. 9 during connection of the connection plug to the plug connection.
Figure 12:
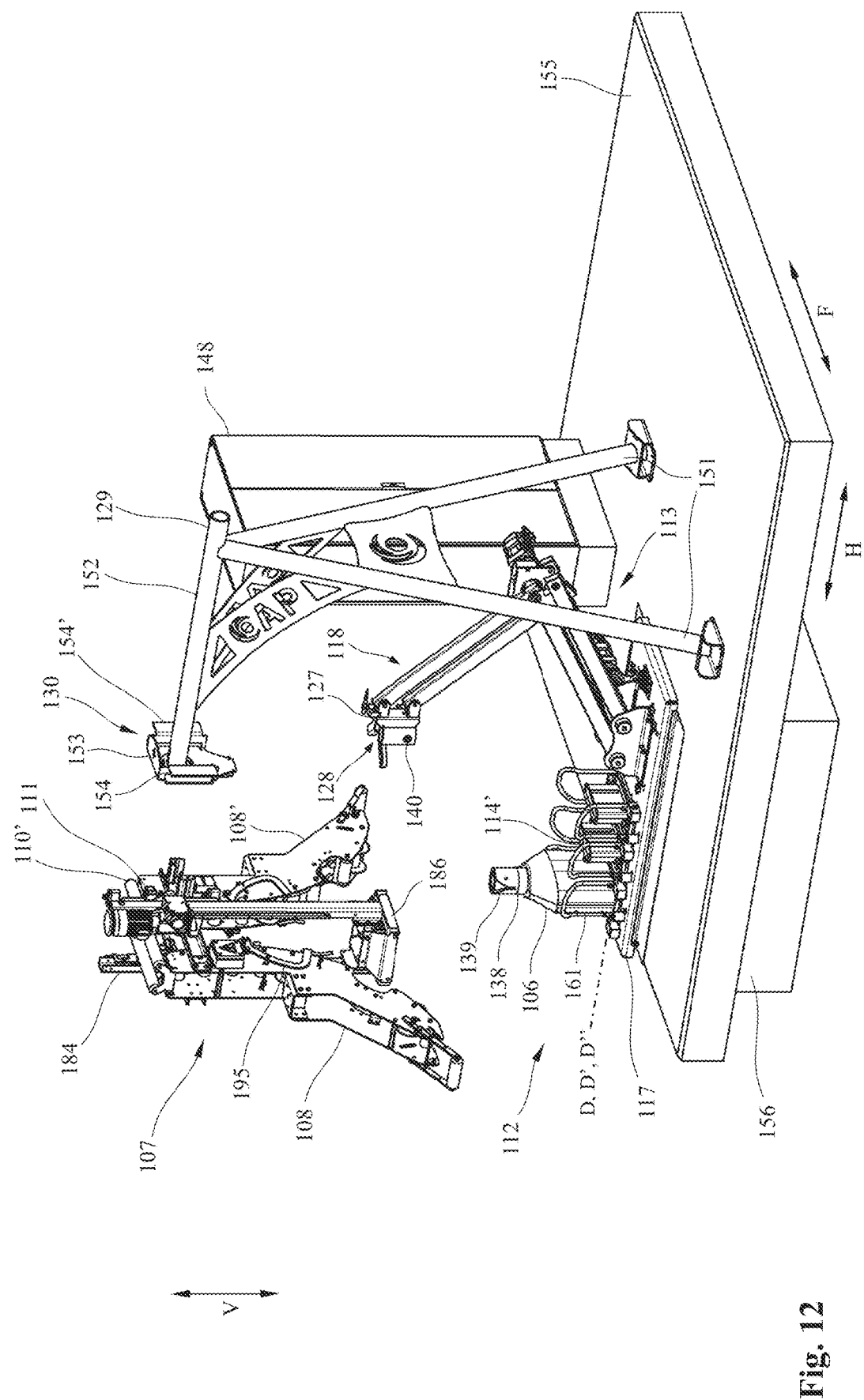
FIG. 12 shows the view from FIG. 9 with the manipulator arm from FIG. 9 in a withdrawn position after loosening of the connection plug.

The connection plug 106 is then brought from the position in FIG. 9 to a plug connection 114, on which it is mounted in the above described manner as shown in FIGS. 10 to 11. The connection plug 106 is again locked against the feed device 112, which is explained subsequently in detail with reference to FIGS. 19 and 20. As shown in FIG. 12, the manipulator 118 can then be released from the connection plug 106 and brought to its rest position.

Figure 13:
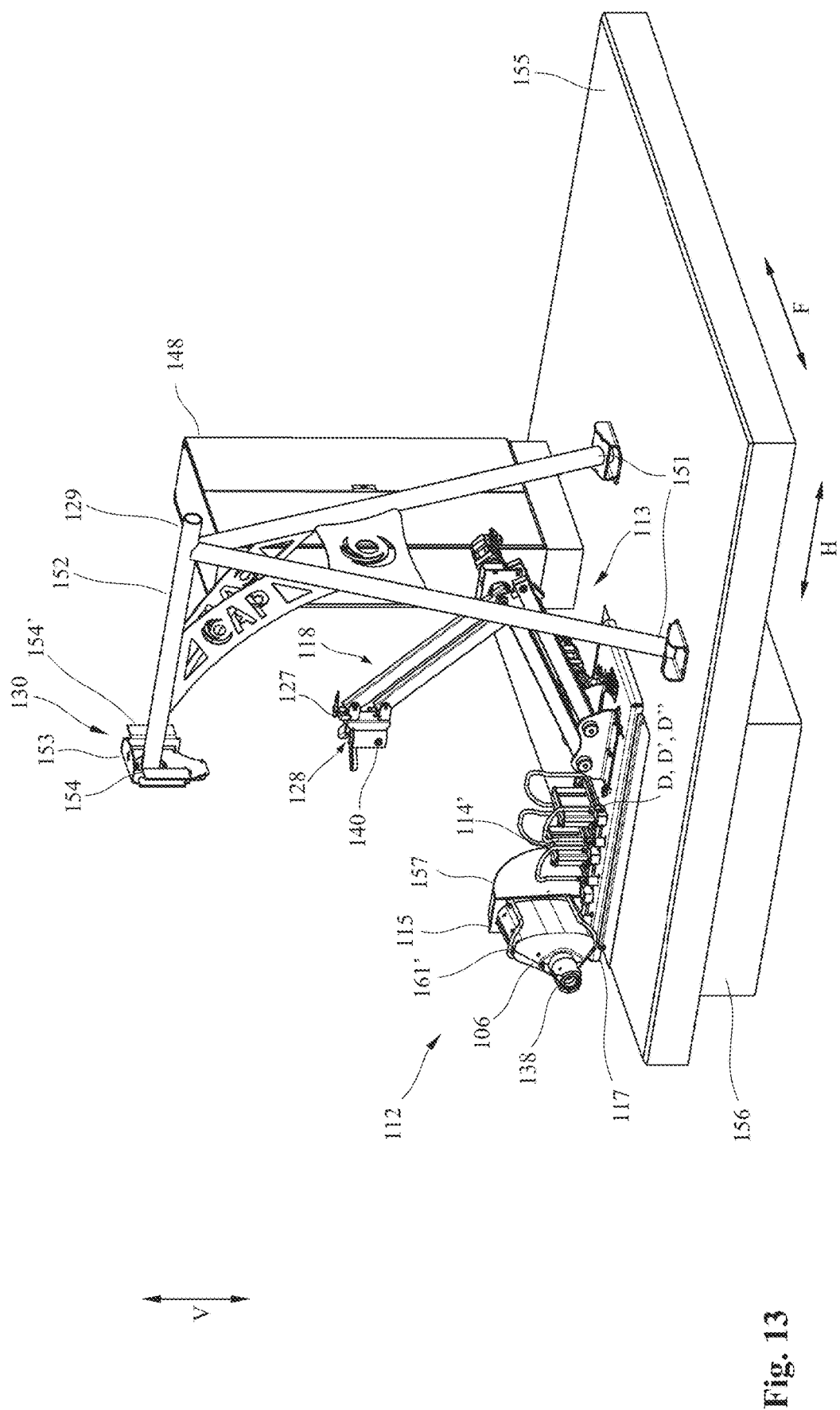
FIG. 13 shows the view from FIG. 12 with the plug connection pivoted from the rest position.

It is shown in FIG. 13 that the connection plug 106 with the plug connection 114 is again pivoted around the axis of rotation D from the rest position depicted in FIG. 12 by movement of the crane 1 (not shown).

The alternative signal mast 129 shown in FIGS. 8 to 13 then has two oblique support feet 151 on which an alternative identifying plate 130 is carried on the front free end of a boom 152. An alternatively designed sensor 111 is arranged accordingly on the cable guide device 107, which is used to detect the identifying plate 130. A distance sensor 111 having a narrow measurement range can then advantageously be used. The identifying plate 130 advantageously has a front central area 153 in the horizontal feed direction H and rear edge areas 154, 154' connected on both sides to it in the travel direction F to the rear relative to the central area 153 in the horizontal feed direction H, i.e., away from the crane 1. The identifying plate 130 preferably has a reflector, for example, a reflector film, in order to reflect the signal emitted by the distance sensor 111 as well as possible. However, the identifying plate 30 from the practical example described further above can also be used.

In order to position the connection plug 106 in the center relative to the central area 153, the distance sensor 111 initially detects the distance to one of the two rear edge areas 154, 154' during travel in the travel direction F from the right or left in FIG. 8. If it then travels farther in the travel direction F toward the central area 153, it detects a sudden distance reduction and therefore the beginning of the front central area 153 on spatial detection of the central area 153. The travel path still necessary in the travel direction F can then be determined via the known geometric dimensions, especially the extent of the central area 153 in the travel direction F, in order to position the connection plug 106 as exactly as possible on the gripping device 127.

In this way positioning of the connection plug 106 relative to the manipulator 118 can be simplified, in which case an active sensor 111 can be arranged only on the cable guide device 107, whereas a passive element can be involved in the identifying plate 130. The identifying plate 130 can then also have other configurations that permit detection of a clearly defined change in distance by the sensor 111. For example, the central area can be offset rearward and the edge areas closer to the crane 1. In particular, in a simplified embodiment the edge areas 154, 154' can be left out so that only the transition from the poorly reflecting environment or the environment not reflecting at all to the readily reflecting area of the identifying plate need be determined. The central area 153 and the edge areas 154, 154' connected to it, whether or not they are offset relative to each other in the horizontal feed direction H, can also have different reflecting properties so that a distinction is made possible by the size of the return signal intensity.

The embodiment according to FIGS. 8 to 28 is also further distinguished from the embodiment in FIGS. 2 to 7 by the configuration of the pivotable plug connections 114. The differences are again taken up subsequently, whereas the comments above concerning FIG. 1 apply accordingly for the same or similar components. Here again, owing to the identical design of the plug connections 114, 114', 114" the invention is further described with reference to the plug connection 114, unless otherwise stated. These comments also apply accordingly for the other plug connections 114', 114".

Figure 20:
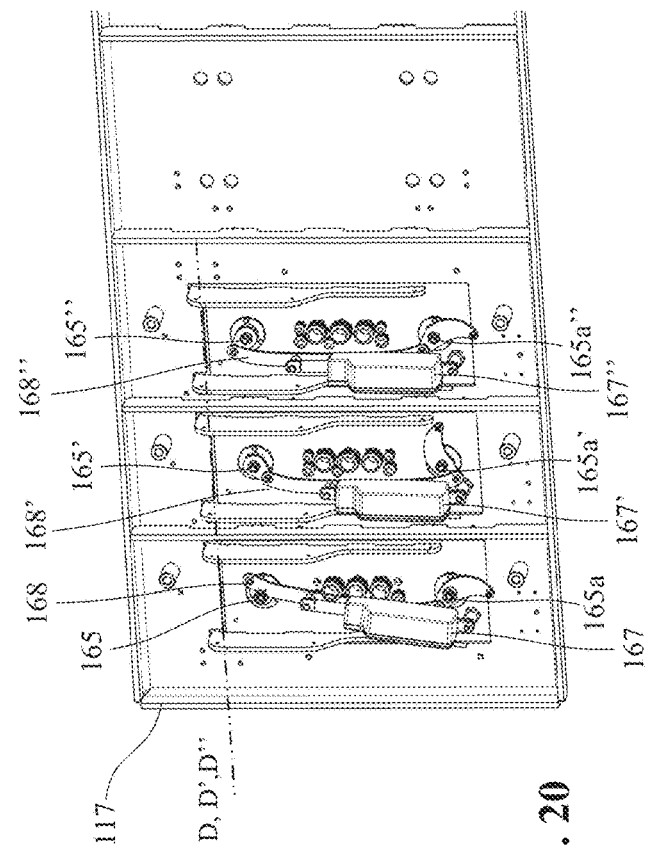
FIG. 20 shows a schematic detail view of the plug locking from FIGS. 18 and 19 from below.

As follows from FIGS. 16 to 18, the plug connection 114 is again mounted with a pivot plate 115 rotatable around an axis of rotation D around a bearing 116 on a fastening plate 117. The plug connection 114, however, could also be arranged directly rotatable on the fastening plate 117. The axis of rotation D then runs essentially horizontal and in the direction of the horizontal feed direction H of the manipulator 118. The fastening plate 117 is arranged via a depression 156 provided in the foundation 155. As is apparent in FIGS. 16 and 18, the cable lead-throughs 150 coming from the switchbox 148 discharged in the depression 156, in which the power supply and data cables 149 indicated in FIG. 16 run. These cables 149 each extend through a connection opening arranged beneath the plug connection 114 in the bottom plate 117 to the bottom of the plug connections 114 where they are electrically connected to the female connection elements of the plug connection 114, as indicated in FIG. 20.

A first protective enclosure 157 movable with the pivot plate 115 around the axis of rotation D is provided on the bottom of the plug connection 114, especially the pivot plate 115 in order to properly guide the cables 149 arranged on its bottom and seal them off relative to the surroundings during pivoting of the plug connection 114, among other things, also for contact protection reasons. Identically designed, circular sector side walls 158, 158' measuring about 100°, as well as a front wall 158" of the first protective enclosure 157 connecting the circular arc sides of the side walls 158, 158', are connected on the bottom of the pivot plate 115, as is readily apparent in FIGS. 15 and 17. An additional face between the side walls 158, 158', the front wall 158" and the pivot plate 115 remains free and forms an opening 158''' visible in the front in FIG. 18 for the cables 149 coming from the cable lead-through 150.

Figure 14:
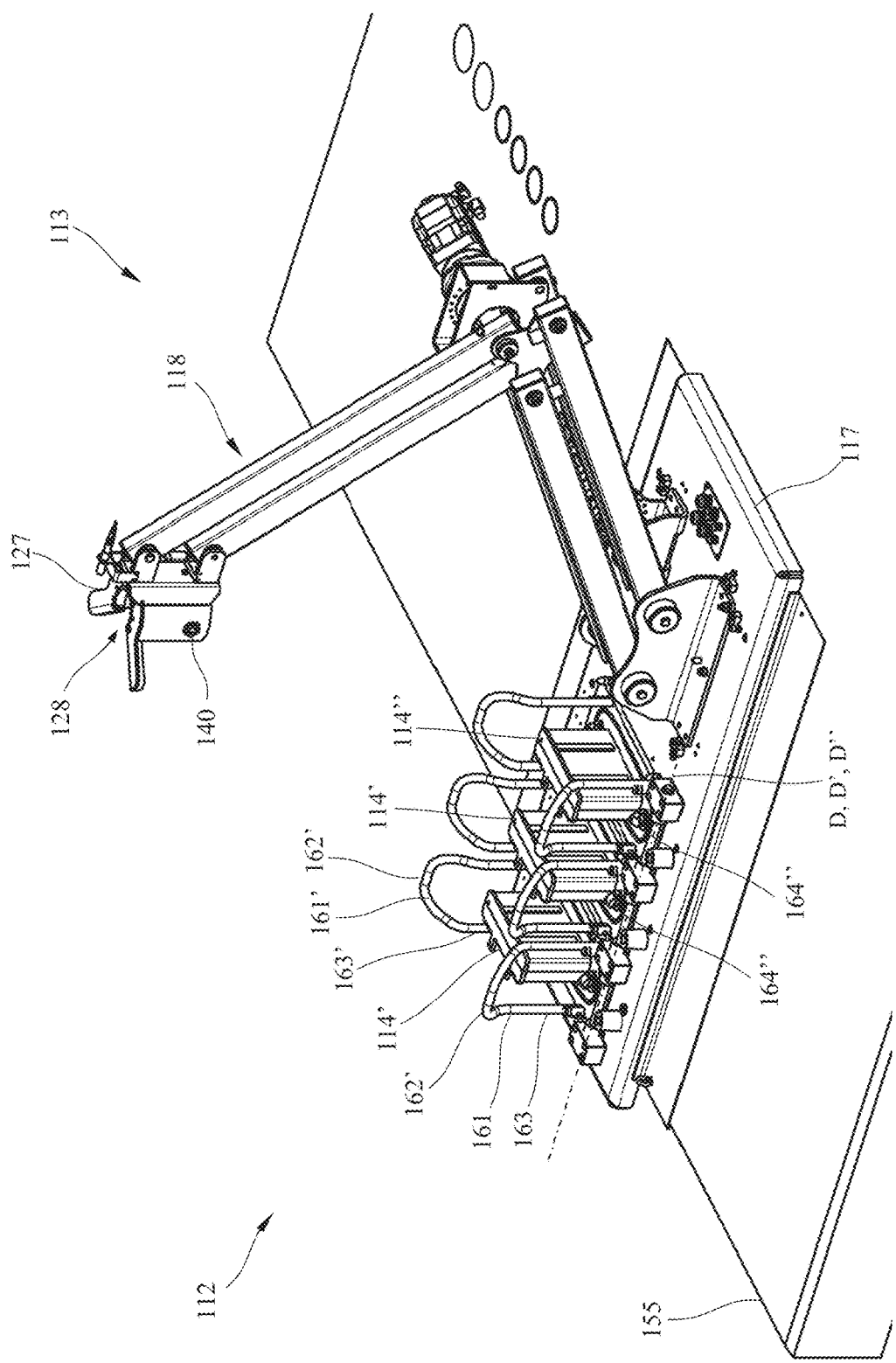
FIG. 14 shows an enlarged detail view of the feed device and the connection device from FIG. 9 with the plug connection in the rest position.

The first protective enclosure 157 runs in a second somewhat larger but correspondingly designed second protective enclosure 159 arranged fixed on the bottom of the bottom plate 117 with the circular-sector side walls 160, 160', a front wall 160" connecting them, as well as a front opening 160''' for the cables 149 coming from the cable lead-through 150. However, as an alternative, the second protective enclosure 159 could be dispensed with, since the first protective enclosure 157 also offers protection for the cables 149 when the pivot plate 115 according to FIGS. 14 and 16 is lowered.

Figure 15:
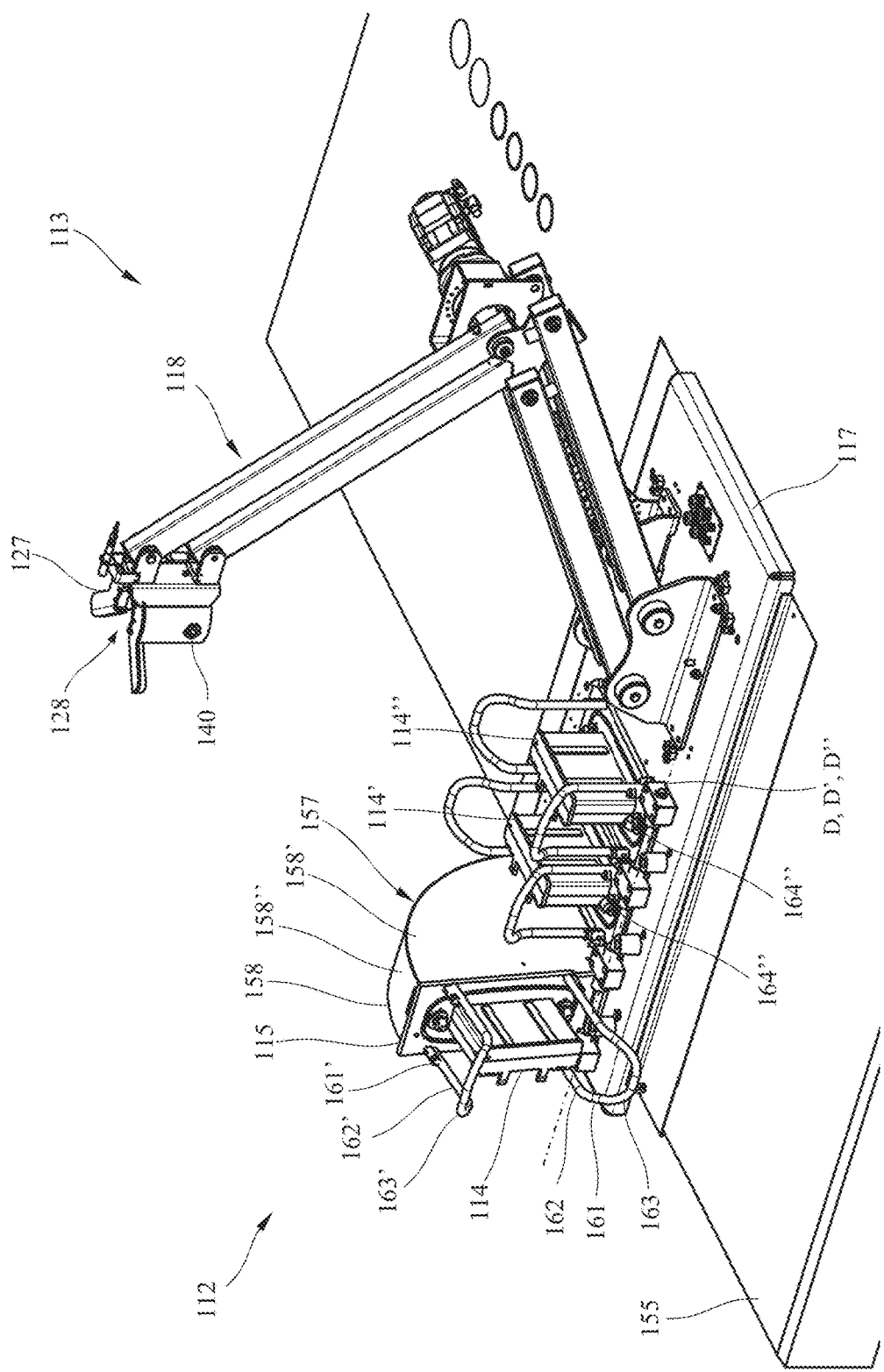
FIG. 15 shows a detail view from FIG. 14 with the plug connection according to FIG. 13 pivoted from the rest position.
Figure 17:
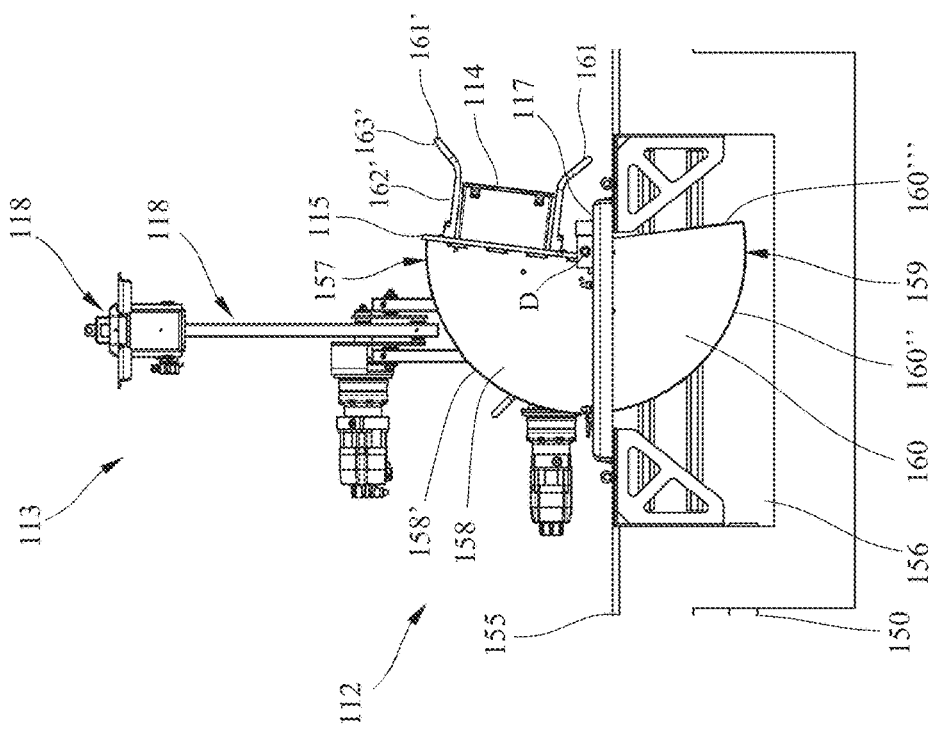
FIG. 17 shows a side view from FIG. 16 with the plug connection pivoted out from the rest position according to FIG. 15.
Figure 18:
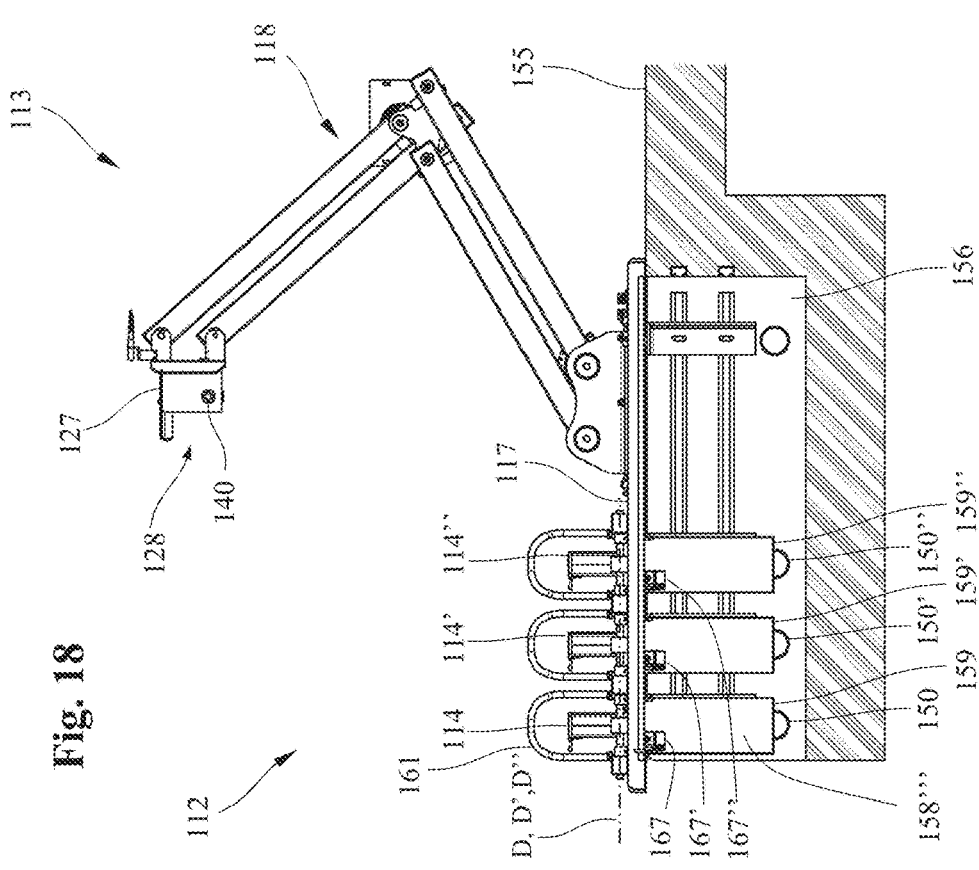
FIG. 18 shows a side view of the partially cut out depiction of the feed device and the connection device from FIG. 14 from the bottom left in FIG. 14.

The cables 149 are then dimensioned in length so that the fully folded-back position of the plug connection 114 depicted in FIGS. 15 and 17 is possible. In the fully pivoted-in position of the plug connection 114 shown in FIGS. 14 and 16, the excess cable length of the cable 149 is folded together preferably within the protective enclosures 157, 159. Since the cables 149 are fully enclosed by them in the region of the protective enclosures 157, 159, the cables 149 can be reliably guided during pivoting of the plug connection 114 so that neither damage to the cables 149 nor hampering of movement of the plug connection 114 need be feared. To the guide cables 149 an energy chain (not shown) can preferably be used, which runs on the bottom of the depression 156 and then runs upward in an S-shape in FIG. 17.

In order to be able to further compensate for not fully precise positioning of the connection plug 106 relative to the plug connection 114, a centering clamp 161, 161' is arranged on the narrow front sides of the pivot plate 115. These then have a lower, vertical guide area 162, 162', to which an upper oblique insertion area 163, 163' facing away from the plug connection 114 is connected. When the plug connection 114 is inserted, as shown, for example, in FIG. 13, the vertical guide areas 162, 162' enclose the connection plug 106 so that improved positioning, especially pre-centering of the connection plug 106 on the plug connection 114, can be achieved.

Figure 19:
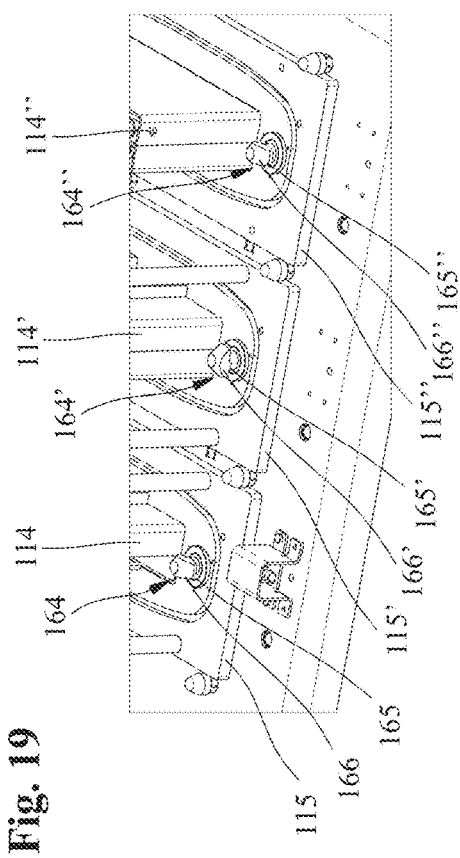
FIG. 19 shows a schematic detail view of a plug locking of the connection device from FIG. 18 obliquely from above.

In order to prevent inadvertent loosening of the connection plug 106 from the plug connection 114, which is especially unfavorable during power transmission, the plug locks 164, 164', 164" are provided on the pivot plates 115, 115', 115" on the front sides of the plug connections 114, 114', 114", which are readily apparent especially in FIGS. 19 and 20. Owing to the identical design of the plug locks 164, 164', 164", only the plug lock 164 is described subsequently unless otherwise stated.

The plug lock 164 then has locking pins 165 extending through the pivot plate 115 in the area of the connection plug 106, which protrude upward above the pivot plate 115 and have an elongated locking head 166. Another identically designed locking pin 165a can be advantageously arranged on the opposite face of the plug connection 114, as indicated in FIG. 20.

Figure 24:
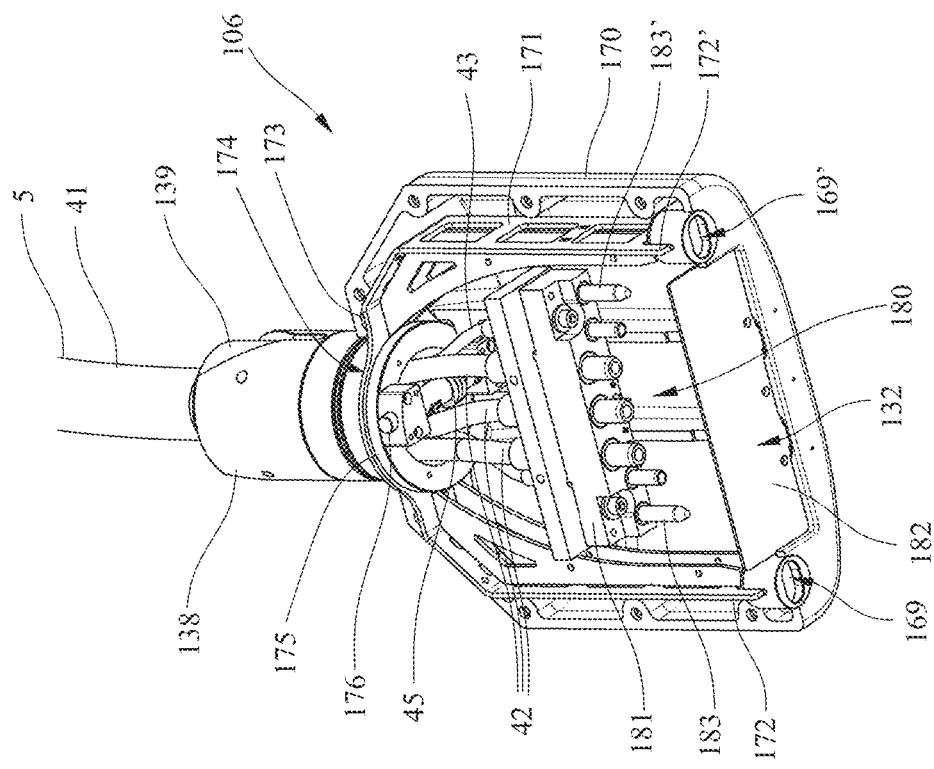
FIG. 24 shows a schematic three-dimensional view of the connection plug from FIG. 22 from a third perspective obliquely from below.

In the opened position the locking head 166 is aligned so that it can be pushed through a corresponding elongated locking opening 169 on the connection plug 106 that is readily apparent, especially in FIG. 24.

When the connection plug 106 is then entirely mounted on the plug connection 114, the locking head 166 as well as the locking head of the locking pin 165a (not shown) can still be moved around a closed position rotated advantageously 90° as depicted in a center plug connection 114' in FIGS. 19 and 20, by means of a locking drive 167 as depicted in FIG. 20 via a lever arrangement 168 simultaneously from an open position, as shown in FIGS. 19 and 20 with reference to the outer two plug connections 114, 114". However, a smaller or larger rotation can also optionally be selected in order to reliably lock it. Preferably the locking drive 167 can simultaneously drive the locking pin 165 and the opposite locking pin 165a via a lever arrangement 168.

Instead of a lever arrangement 168, however, a locking drive can also be provided for each locking pin 165, 165', 165" and 165a, 165a', 165a". In principle, only one plug lock could also be provided on each plug connection 114, 114', 114".

The plug lock 164 in the present case additionally serves to fix the pivot plate 115 against the base plate 117 when no connection plug 106 is connected. For this purpose, the lower lever arm in FIG. 20 drives the lower rear locking pin 165a in FIG. 19 into the fixation position depicted in FIGS. 19 and 20 beneath the base plate 117 so that the pivot plate 115 cannot be pivoted away from base plate 117 around the axis of rotation D running above the base plate 117. In contrast to this, fixation of the middle pivot plate 115' is opened so this can be tilted. As an alternative or in addition, a mount independent of the plug lock 164, especially plug connection locking for releasable fastening of the plug connection 114 in the rest position against base plate 117, can also be provided until the connection plug 106 and the plug connection 114 are securely connected to each other.

A further aspect of the invention proposes that the line cable 5 has a special structure for better automatic connection. The connection plug 6, 106 can also be advantageously designed specially in order to improve gripping with the manipulator 18, 118 and especially the gripping device 27, 127, and specifically in both of the practical examples described above.

This is described in detail below, especially with reference to FIGS. 21 to 24.

Figure 21:
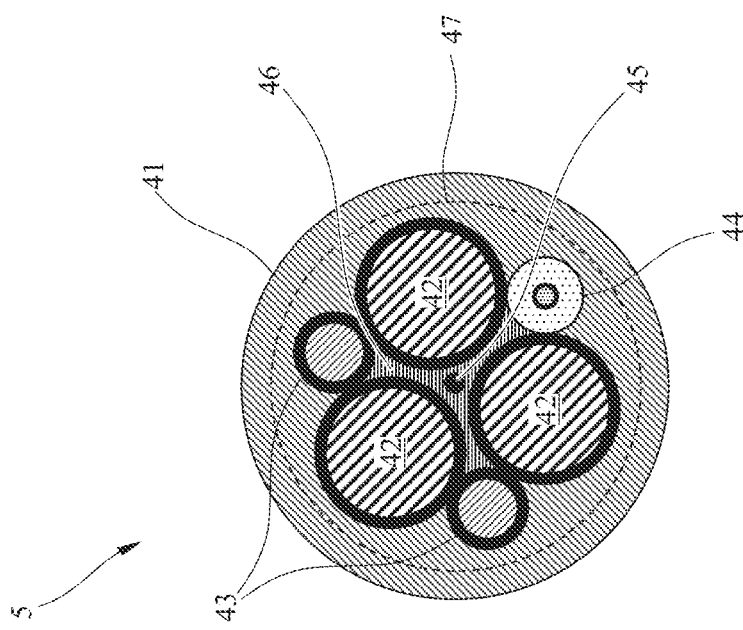
FIG. 21 shows a cross-sectional view through a line cable.

FIG. 21 shows a cross-section through a line cable 5, for example, slightly above the connection plug 106. The line cable 5 then has an outer sheath 41 made from a flexible material, for example, rubber, PVC or another elastic plastic. The outer sheath 41 encloses three symmetrically arranged phase conductors 42 for electrical power transmission, a protective conductor divided into two individual conductors 43 as well as a data transmission conductor 44, especially an optical data transmission cable. A flexible but nevertheless robust support device 45 is also provided in the core of the line cable 5, for example, an aramid cable or wire cable. The support device 45 is enclosed by a filler and/or molded parts 46 that exert a support and holding function for the additional conductors 42 to 44 of the line cable 5.

Because of this the sensitive conductors 42 to 44 arranged in the line cable 5 can be unloaded of tension, while the support device 45 serves essentially to take up the longitudinal forces during winding and unwinding of the line cable 5. In addition, further tension relief 47 can be provided via the outer sheath 41, for example, a mesh or fabric embedded in the outer sheath 41.

In order for the support device 45 to be able to serve as tension relief, it is fastened as described below in the partially separated connection plug 106 depicted in detail in FIGS. 22 to 24.

Figure 22:
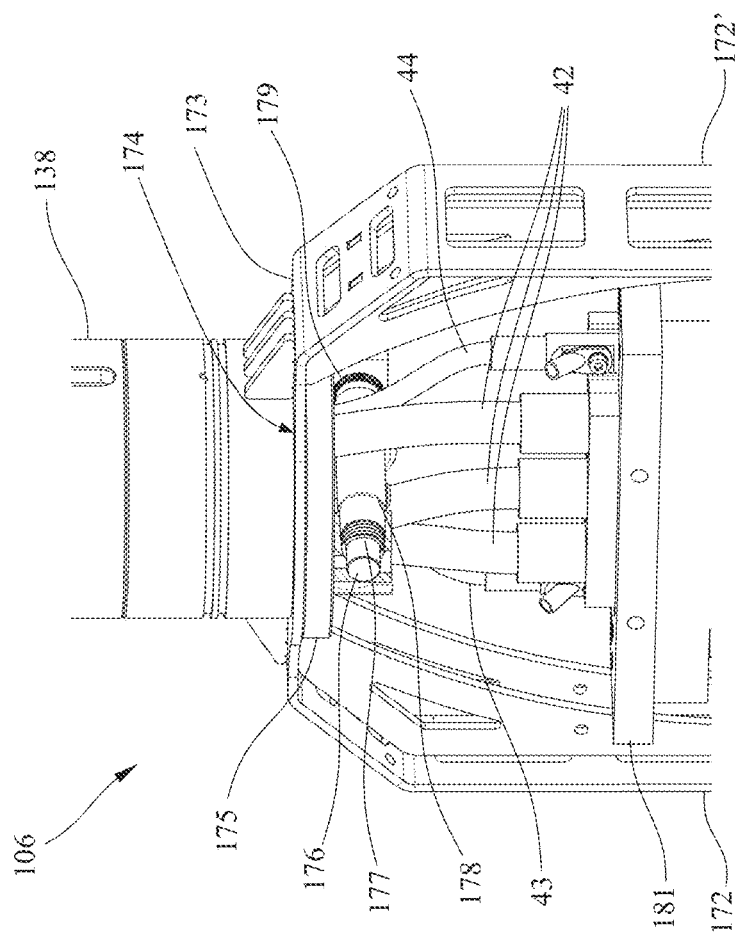
FIG. 22 shows an enlarged schematic three-dimensional detail view of an opened connection plug from a first obliquely lateral perspective.
Figure 23:
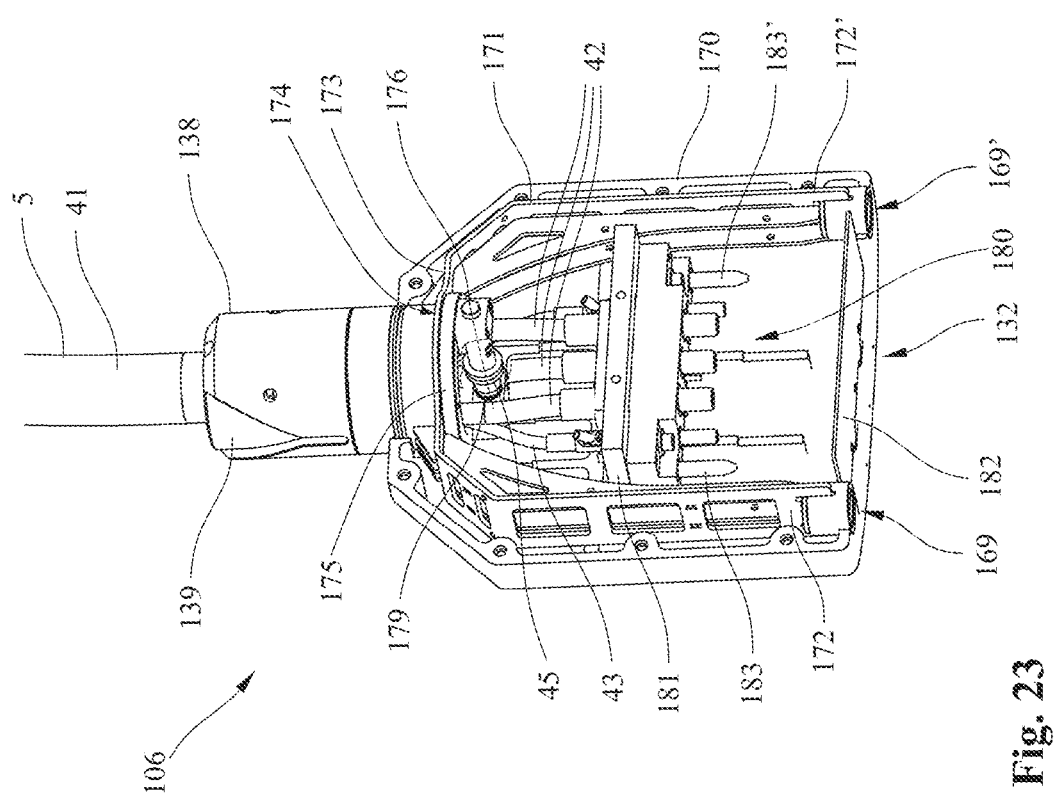
FIG. 23 shows a schematic three-dimensional view of the connection plug from FIG. 22 from a second obliquely lateral perspective.
Figure 26:
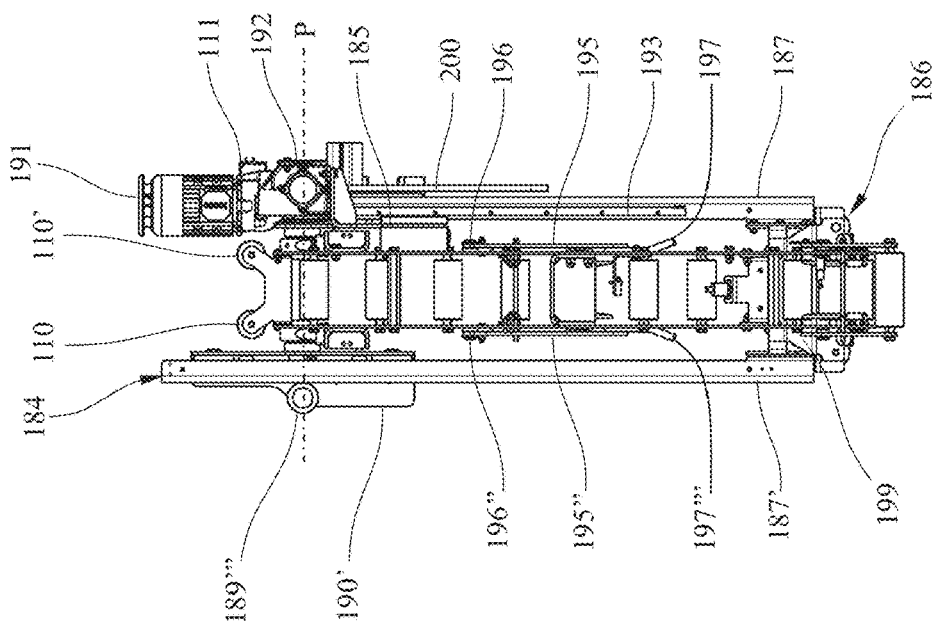
FIG. 26 shows a side view of the cable guide device from FIG. 25 from the left in FIG. 25.

The connection plug 106 has two plug cladding halves, only one plug cladding half 170 of which is shown in FIGS. 22 and 23, whereas the other is removed in order to be able to show the interior of the connection plug 106.

An essentially U-shaped support frame 171 made from a robust material, especially a steel sheet, is also provided, which has the already mentioned locking openings 169, 169' designed as an elongated hole on its free arm ends 172, 172'. The middle part 173 of the support frame 171 connecting the free arm ends 172, 172' then has a circular opening 174, through which the essentially hollow cylindrical gripping part 138 of the connection plug 106 is passed through from below in FIGS. 22 and 23. The gripping part 138 abuts an outer flange 175 in the shape of a circular ring on the support arm 171 and is fastened there, for example, screwed or riveted.

In order to be able to take up loads in the longitudinal direction of the line cable 5, tension unloading 47 of the outer sheath 41 can be clamped (not visible) in the gripping part 138 and/or on the support frame 171, on the one hand. On the other hand, a clamping pin 176 running across the longitudinal direction of the line cable 5 is provided on the outer flange 175 in the shape of a circular ring of the gripping part 138. The clamping pin 176 has a fastening (not shown) for the support device 45, especially a passage opening through which the support device 45 can be pushed. A spring element, especially a coil spring 177, is arranged on the clamping pin 176, which is connected to an enclosing clamping pin sleeve 178, on which one end of the support device 45 is fastened. For tightening of the support device 45, the clamping pin 176 is initially forced out in its axial direction against the pressure of a coil spring 177 sitting on a beveled end 178 of the clamping end 176 from an anti-slip safety 179 depicted in FIG. 22. The clamping pin 176 is then repeatedly rotated in the winding direction so that the support device 45 is wound onto the clamping pin 176 with several windings. In order to prevent the support device 45 from unwinding again under load, the coil spring 177 then forces the clamping pin 176 back into the anti-slip safety 179 readily apparent in FIG. 22. Instead of the coil spring 177, other spring elements can also be used, for example, disk springs that force the clamping pins reliably back into the anti-slip safety 179 after tightening of the support device 45. The anti-slip safety 179 can then advantageously have a knurled inner hole with which an also knurled end of the clamping pin 176 cooperates.

The different conductors 42 to 44, on the other hand, are guided unloaded through the circular opening 174 in the support frame 171 in the area between the free arm ends 172, 172' of the support frame 171 and connected there electrically and mechanically to the male electrical connection elements 180 in the connection plug 106. The individual male connection elements 180 are arranged on a connection support 181, which is held fixed in the longitudinal direction running from the connection plug opening 132 to the gripping part 138, i.e., also in the longitudinal direction of the line cable 5, and mounted free-floating across this longitudinal direction.

In order to protect the male connection elements 180 against unpermitted contact and other external influences, the connection plug opening 132 is closed by a protective flap 182. The protective flap 182 is then held by spring action in the closed position depicted in FIGS. 21 and 22 but can be tilted back by the force of the manipulator 118 in the area between the free arm ends 172, 172' during positioning of the connection plug 106 on the plug connection 114.

In order to be able to introduce the male connection elements 180 of the connection plug 106 into corresponding female connection elements (not shown) on the plug connection 114, elongated centering pins 183 with a conical end are provided on the connection support 181, which engage in corresponding centering openings of the plug connection 114 (not shown).

The centering funnel 139 on the gripping part 138 is readily apparent in FIG. 23, which in addition to the embodiment depicted in FIGS. 2 to 7 is lengthened slit-like into a centering slit on its lower end. The connection plug 106 can be gently aligned as perfectly as possible on the plug connection 114 during gripping with the gripping device 127 via the centering mandrel 140 provided in the insertion opening 128 of the gripping device 127 indicated in its position in the drawing.

An alternative cable guide device 107 as depicted in detail in FIGS. 25 to 28 also has as additional function to the embodiment depicted in FIG. 2 as a swing arm 184 for better guiding of the line cable 5 (not shown in the drawing) in FIGS. 8 to 20 and 25 to 28. In principle, such swing arms are already known, but in the present case the possibility of linear mobility, especially linear height adjustment of the swing arm 184, is new relative to them. This serves to move out the swing arm 184 situated fully in the lower position during travel of the crane 1 entirely upward and from the gripping area of the manipulator 118 for automatic gripping of the connection plug 106 by means of the manipulator 118 and for proper positioning of the connection plug 106.

Figure 27:
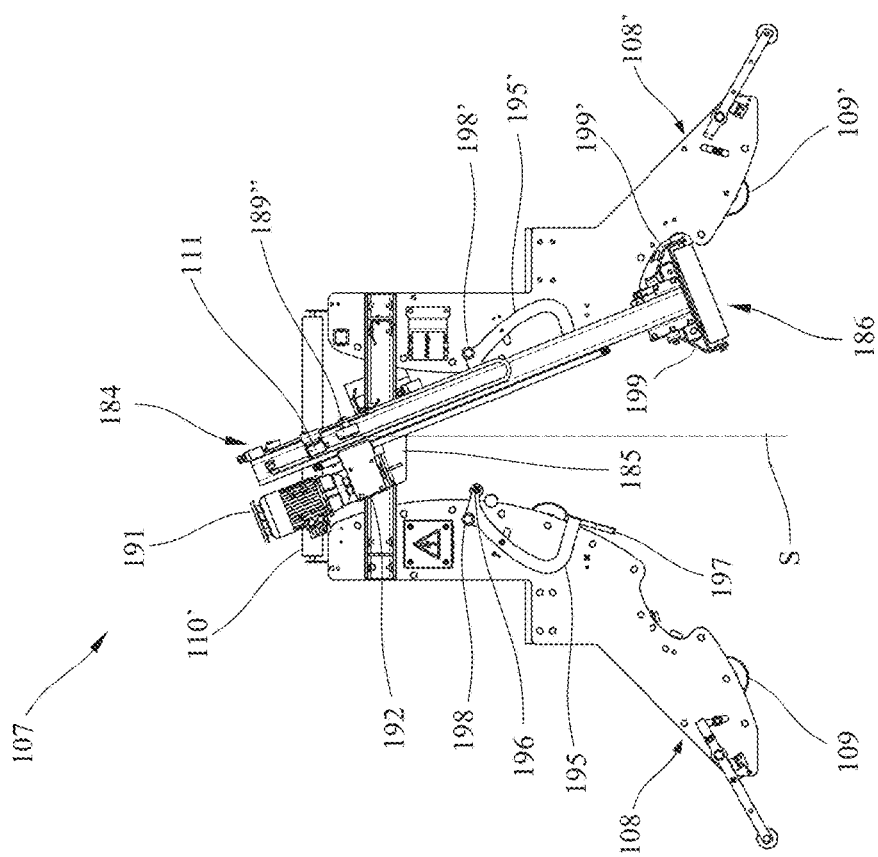
FIG. 27 shows a front view of the cable guide device from FIG. 25 with a height-adjustable swivel in a first lower position.

A swivel mount 185 rotatable around an essentially horizontal pivot axis P aligned across the travel direction F of the crane 1 is then provided on the cable guide device 107 so that the swing arm 184 can swing back and forth around the pivot axis P, as is apparent in FIG. 27.

Deflection of the swing arm 184 from the vertical S is produced in known fashion by the line cable 5 wound or unwound during travel of the crane 1, which runs through a cable guide 186 arranged on the lower end of the swing arm 184 with longitudinally and transversally aligned cable guide rollers. It can then be detected via known, not further shown taut and slack sensors whether the line cable 5 is guided taut or slack and the line cable 5 can then optionally be pulled in or paid out. The line cable 5 is preferably guided through an additional cable guide arranged in front of the cable guide 186 of the swing arm 184 in the pay-out direction of the line cable 5, which is advantageously arranged between and/or on the upper end of the two roller bends 108, 108'. The cable guide can advantageously be formed by side guide rollers 110, 110', but other possibilities for guiding a line cable 5 could also be provided.

Figure 25:
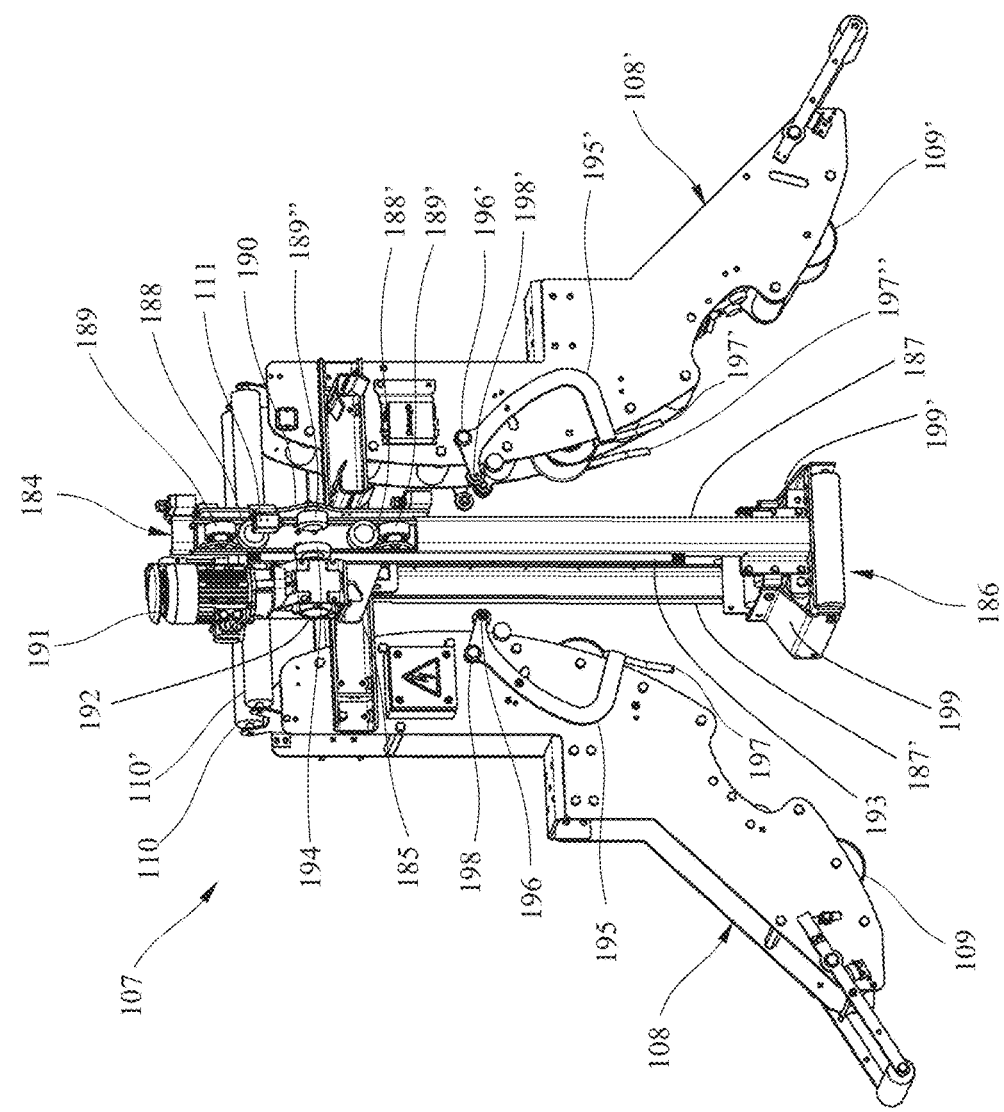
FIG. 25 shows a schematic three-dimensional view of a cable guide device from FIGS. 9 to 12.
Figure 28:
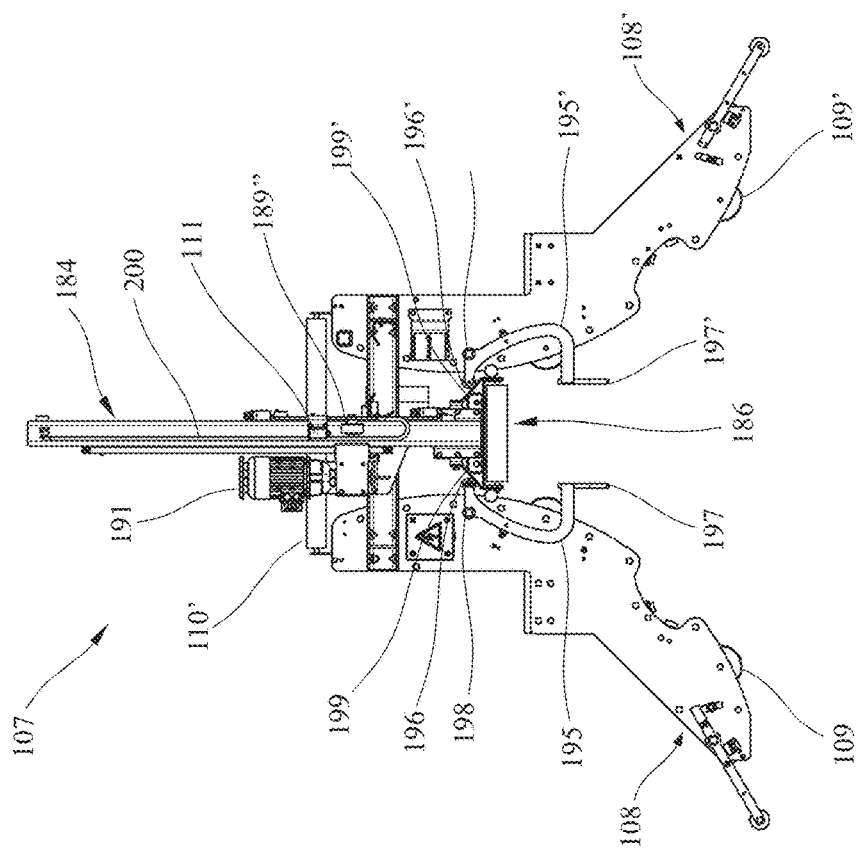
FIG. 28 shows a front view of the cable guide device from FIG. 25 with the height-adjustable swivel in a second upper position.

In order to be able to move the swing arm 184 back and forth between the upper and lower extreme positions depicted in FIGS. 25 and 28, the swing arm 184 has two guide rails 187, 187' facing each other with their open sides and U-shaped in cross-section, depicted partially broken down in FIG. 25. The guide rail 187 is guided by means of lateral guide rollers 188, 188', inner front guide rollers 189, 189' and an outer front guide roller 189" running on the outside of the center arm of the guide rail 187 positioned on the swivel mount 185. The guide rail 187 is then guided laterally by an angled guide sheet 190, on which the outer front guide roller 189" is arranged. Guiding of the guide rail 187' is designed accordingly, in which case the guide sheet 190' of the other guide rail 187' with the external front guide roller 189''' arranged on the side of the cable guide device 107 opposite the swivel mount 185 is readily visible in FIG. 26.

A swivel drive movable with the swing arm 184 is also provided on the swivel mount 185 with an electric motor 191, a 90° gear mechanism 192, as well as a drive pinion 194 meshing on a rack 193 mounted on the swing arm 184. The swing arm 184 can be moved by the motor back and forth in its longitudinal direction relative to the swivel mount 185. As an alternative, a direct linear drive or toothed belt drive can also be used for retraction and extension of the swing arm 184.

In order to be able to properly position the connection plug 106 for the gripping device 127 in the cable guide device 107, the swing arm 184 travels fully upward, as shown in FIGS. 8 to 11 and 28. At the same time or afterward, the connection plug 106 is pulled fully upward via the line cable 5 to the cable guide 186 of the swing arm 184.

In order to be able to position the connection plug 106 even better for gripping by the manipulator 118 in the cable guide device 107, retaining clamps 195, 195' opposite each other are arranged on the roller bends 108, 108'. The retaining clamps 195, 195' are then rotatable around essentially horizontal axes of rotation 196, 196' running across the travel direction F and have downward running rod-like holding extensions 197, 197', 197", 197''', which lie against the connection plug 106 in the upper position depicted in FIGS. 8 and 28 and thus prevent twisting or escape of the connection plug 106 during gripping by the gripping device 127.

The retaining clamps 195, 195' are held in standard fashion by springs in the open retracted position against the roller bends 108, 108' shown in FIGS. 12, 25 and 27.

Only when the swing arm 184 is moved into the upper retaining position depicted in FIGS. 8 to 11 and 28, do the stop rollers 198, 198' abut the upper shorter lever arms of the retaining clamps 195, 195' on corresponding stops 199, 199' of the cable guide 186 so that the lower, longer, roughly L-shaped inward bent lever arms of the retaining clamps 195, 195' are moved toward each other and toward the connection plug 106. The retaining clamps 195, 195' can also be configured differently, it being essential only that during raising of the swing arm or optionally also the connection plug 106 the retaining clamps 195, 195' are moved against the connection plug 106.

As is apparent in FIG. 27, the cable guide stops 199, 199' then additionally serve as activation elements for the not further shown taut sensors, when the swing arm 184 is pulled into its laterally fully deflected position.

The sensor 111 described above is arranged on the swing arm 184, in which it is supplied power via an energy chain 200 and is connected in terms of data to the crane control. The sensor 111, however, could also be arranged at a location of the cable guide device 107 or also on the crane 1 and could also be connected wirelessly to the control.

Figure 30:
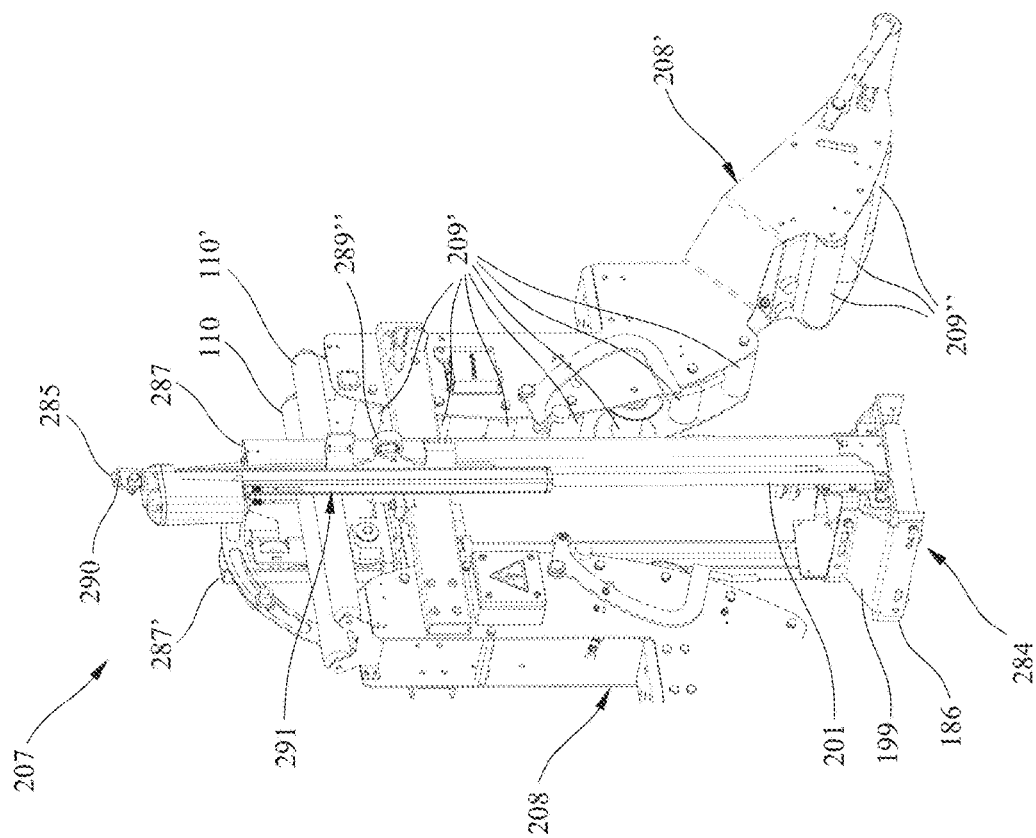
FIG. 30 shows part of a schematic three-dimensional view from FIG. 29 from another perspective.
Figure 29:
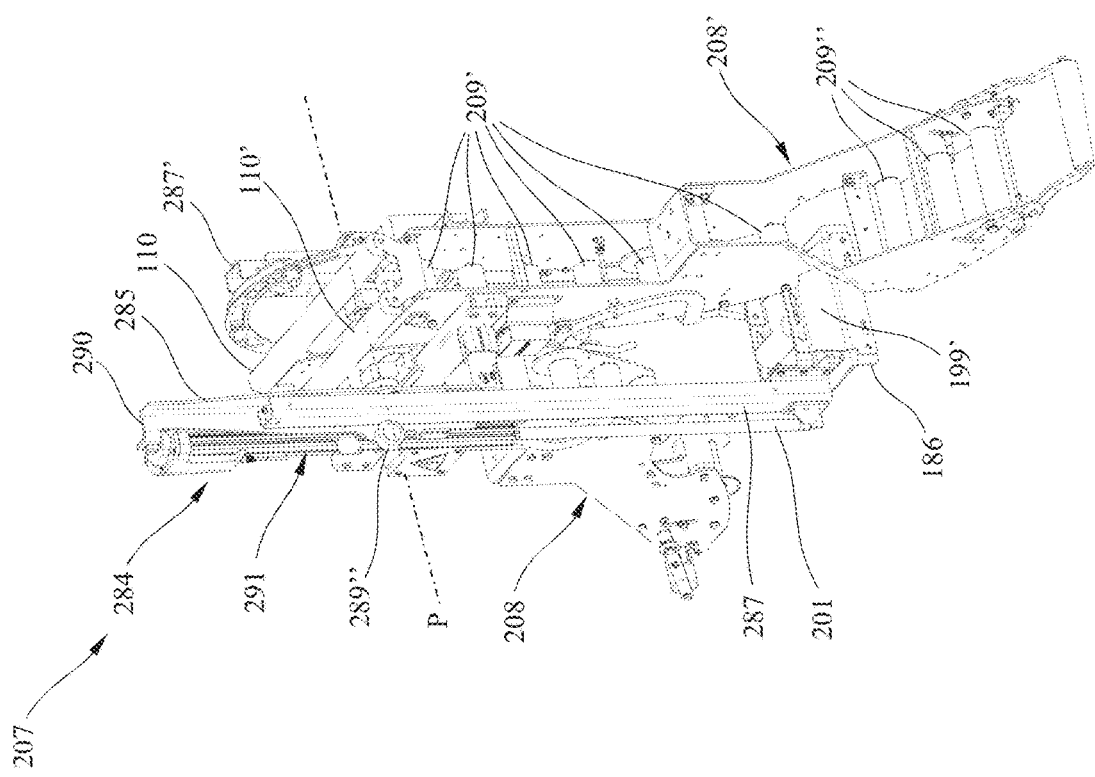
FIG. 29 shows a schematic three-dimensional view of an alternative cable guide device.

FIGS. 29 to 30 show an alternative embodiment of the cable guide device 207, which differs essentially by two things from the embodiment shown in FIGS. 25 to 28, namely, on the one hand, the configuration of roller bends 208, 208' and longitudinal guide rollers 209, 209' and 209", as well as, on the other hand, an alternative drive 291 of a swing arm 284. Corresponding reference numbers, each supplemented by the number "200", are therefore used in the cable guide device 207. In addition, the differences are taken up here mostly so that comments concerning corresponding parts in the first variant according to FIGS. 2 and 7 and the second variant according to FIGS. 8 to 28 also apply accordingly in the variant depicted in FIGS. 29 and 30, unless otherwise stated.

Outer longitudinal guide rollers 209" in the outer lower area of the roller bend 208' are then wider than the inner longitudinal guide rollers 209' of the roller bend 208' arranged in the interior, upper area of the roller bend 108'. This has the advantage that during payout of the line cable 5 not fully parallel to the travel direction F of the crane 1, the line cable 5 in the outer area of the roller bend 208 can have a somewhat more lateral offset, i.e., a slightly oblique alignment of the line cable 5 relative to the longitudinal extent of the roller bend 208 when viewed from above on the cable guide device 207. For this purpose, the frame of the roller bend 208' on its outer, lower, outward facing end preferably has a larger spacing of two opposite walls, between which the longitudinal guide rollers 209" are fastened, than in the area of the inner, narrower longitudinal guide rollers 209'. The second, other roller bend 208 is designed correspondingly shifted to the side, otherwise the comments concerning the roller bend 208' apply accordingly.

In addition, instead of the rotational electric motor 191 depicted in FIGS. 25 to 28, a direct linear drive 291 is used for longitudinal movement of the swing arm 284. The swivel mount 285 is then lengthened somewhat upward, as is the angled guide sheet 290. The drive part of the linear drive 291 can preferably be supported on the angled guide sheet 290 or the swivel mount 285, whereas a movable piston rod 201 of the linear drive 291 is fastened to the movable part of the swing arm 284. The end of the piston rod 201 on the takeoff side can preferably be mounted on the lower end of the movable part of the swing arm 284 in FIGS. 29 and 30, especially a U-shaped guide rail 287. For raising of the swing arm 284, the piston rod 201 is then moved upward.

As described in detail above, a simple automatic connection of the connection plug 6, 106 of the line cable 5 to the feed device 12, 112 can be made possible by means of the connection device 13, 113 according to the invention without the need to insert or unplug the connection plug 6, 106 by hand. For this purpose, according to a further aspect of the invention the line cable 5 can have a special structure for better automatic connection. The connection plug 6, 106 can also be advantageously designed in order to improve gripping with the manipulator 18, 18 and especially the gripping device 27, 127. For simplified automatic gripping of the line cable 5 and the connection plug 106 a height-adjustable swing arm 284 can also be provided. A further aspect of the invention permits cable-sparing guiding of the line cable 5.

The feed direction H preferably runs to the cable guide device 7, 107 or 207 and the crane 1 and from it and preferably across the travel direction F. In an embodiment not shown the manipulator 18 or 118 and/or the gripping device 27 or 127, however, can also be movable in the travel direction F in order to be able to compensate for any offset in the travel direction F. The manipulator 18 or 118 and/or the gripping device 27 or 127 can also be rotatable around a vertical axis in order to be able to better compensate for angular offset, for example, with an obliquely positioned cable guide device 7, 107 or 207.

LIST OF REFERENCE NUMBERS

1 Container crane (E-RTG)
2 Container
3, 3' Wheels
4 Cable drum
5 Line cable
6; 106 Connection plug
7; 107; 207 Cable guide device
8, 8'; 108, 108'; 208, 208' Roller bend
9, 9'; 109, 109'; 209, 209', 209" Longitudinal guide rollers
10, 10', 110, 110' Lateral guide rollers
11; 111 Sensor unit
12; 112 Feed device
13; 113 Connection device
14, 14', 14"; 114, 114', 114" Plug connections
15, 15'; 115, 115', 115" Connection part (pivot plate)
16, 16'; 116 Bearing for connection part
17; 117 Fastening plate
18; 118 Manipulator
19 Manipulator base
20 Lower manipulator arm
21, 21', 21" Lower partial arms
22 Lower manipulator drive
23 Cross-shaped connection piece
24 Upper manipulator arm
25, 25' Upper partial arms
26 Upper manipulator drive
27; 127 Gripping device
28; 128 Funnel-like introduction opening
29; 129 Signal mast
30; 130 Identifying plate
31 Signal light
32; 132 Connection plug opening
33, 33' Connection housing
34, 34' Cover
35, 35' Hinges for cover 36, 36' Activation tabs for cover
37, 37' Stop for pivot plate
38, 138 Gripping part connection plug
39, 139 Centering funnel
40, 140 Centering mandrels
41 Outer sheath
42 Phase conductor
43 Protective conductor
44 Data transmission conductor
45 Support device
46 Filler, molded article
47 Tension relief
148 Switchbox
149 Power supply and data cable
150, 150', 150" Cable lead-throughs
151 Support feet
152 Boom
153 Central area identifying plate
154, 154' Edge area identifying plate
155 Foundation
156 Depression
157, 157', 157" First movable protective enclosures
158, 158', 158", 158"' Side walls, front wall, opening first protective enclosure
159, 159', 159" Second, fixed protective enclosures
160, 160', 160", 160"' Side walls, front wall, opening second protective enclosure
161, 161' Centering clamp
162, 162' Vertical guide area centering clamp
163, 163' Oblique insertion area centering clamp
164, 164', 164" Plug lock
165, 165', 165" Locking pin
165a, 165a', 165a" Locking pin
166, 166', 166" Elongated locking head
167, 167', 167" Locking drive
168, 168', 168" Lever arrangement
169, 169' Elongated locking opening
170 Plug cladding halves
171 U-shaped support frame
172, 172' Arm ends
173 Support frame—middle part
174 Circular opening support frame
175 Outer flange gripping part
176 Tightening pin
177 Coil spring
178 Beveled end of tightening pin
179 Anti-slip safety
180 Manual connection elements connection plug
181 Connection support
182 Protective flap
183 Elongated centering pin
184; 284 Swing arm
185; 285 Swivel mount
186 Cable guide
187, 187'; 287, 287' U-shaped guide rails
188, 188' Lateral guide rollers
189, 189', 189"', 189"'; 289" Frontal inside and outside guide rollers
190, 190'; 290 Angled guide sheet
191; 291 Electric motor (rotational), linear drive
192 90° gear mechanism
193 Rack
194 Drive pinion
195, 195' Retaining clamp
196, 196' Retaining clamp—axes of rotation
197, 197' Retention extensions
198, 198' Stop rollers
199, 199' Cable guide stops
200 Energy chain
201 Piston rod linear drive
D Horizontal axis of rotation connection part
F Travel direction crane
H Horizontal feed direction manipulator
P Pivot axis swing arm
S Vertical of swing arm
V Vertical feed direction manipulator

The invention claimed is:

1. A connection device to produce a wired supply of an electric load movable relative to a feed device in at least one travel direction with at least one of electrical power and data, in which the feed device has at least one connection member for connection to a corresponding connection element of a line cable carried by the load, wherein the connection device has a manipulator for connection of the connection element to the at least one connection member, wherein the manipulator has a gripping device for gripping of the line cable and/or the connection element, and wherein the gripping device has a funnel-shaped insertion opening for the line cable and/or the connection element.

2. The connection device according to claim 1, wherein the manipulator is movable in at least one horizontal feed direction and/or a vertical feed direction.

3. The connection device according to claim 1, wherein the manipulator is rotatable around a vertical axis.

4. The connection device according to claim 1, wherein the gripping device has a locking device for releasable holding of the line cable and/or the connection element on the gripping device.

5. The connection device according to claim 1, wherein the connection device has a guide that keeps the gripping device in a largely identical slope angle relative to the at least one connection member during movement of the manipulator.

6. The connection device according to claim 5, wherein the manipulator has a lower manipulator arm and an upper manipulator arm, each of which is designed as a parallelogram guide.

7. A method for connection of a line cable arranged on an electric load having a feed device, relative to which the load is movable, in which the line cable can be paid out or retrieved from a reservoir carried by the load according to a distance between the reservoir and the feed device, the method comprising:
positioning of a connection element of the line cable relative to the feed device,
gripping of at least one of the connection element and the line cable by the manipulator of the connection device of claim 1,
connecting the connection element to a connection member of the feed device by the manipulator.

8. A power supply system for wired supply of a movable electric load using at least one of electrical power and data, the power supply system comprising a connection device to produce the wired supply of the electric load movable relative to a feed device in at least one travel direction with the at least one of electrical power and data, in which the feed device has at least one connection member for connection to a corresponding connection element of a line cable carried by the load, wherein the connection device has a manipulator for connection of the connection element to the at least one connection member whereby in the connection device the line cable can be paid out or retrieved from a reservoir carried by the load according to a distance between the reservoir and the feed device, wherein the at least one connection member is rotatable around at least one pivot axis.

9. The power supply system according to claim 8, wherein the reservoir is a motor-driven cable drum.

10. The power supply system according to claim 8, wherein a laying direction of the line cable runs from the feed device to an outlet of the line cable from a cable guide device arranged on the load.

11. The power supply system according to claim 8, wherein the at least one pivot axis runs across the travel direction or a laying direction of the line cable running from the feed device to the movable load.

12. The power supply system according to claim 11, wherein a plug lock is provided for locking of the connection element to the at least one connection member.

13. The power supply system according to claim 8, wherein the at least one pivot axis runs essentially parallel to a base provided for laying of the line cable.

14. The power supply system according to claim 8, wherein the at least one connection member is pivotable around an additional pivot axis running substantially perpendicular to a base provided for laying of the line cable.

15. The power supply system according to claim 8, wherein the feed device has a holding device for holding of the at least one connection member in a rest position.

16. The power supply system according to claim 15, wherein the line cable protrudes upward in the rest position.

17. The power supply system according to claim 15, wherein the at least one connection member can be deflected from the rest position in both directions of rotation of the at least one pivot axis.

18. The power supply system according to claim 15, wherein a return device is provided in order to move the at least one connection member from a position deflected from the rest position back into the rest position.

19. The power supply system according to claim 15, wherein a connection lock for locking of the at least one connection member in the rest position is provided.

20. The power supply system according to claim 8, wherein a pivot angle around the at least one pivot axis is at most 225°.

21. A power supply system, for wired supply of a movable electric load using at least one of electrical power and data, the power supply system comprising a connection device to produce the wired supply of the electric load movable relative to a feed device in at least one travel direction with the at least one of electrical power and data, in which the feed device has at least one connection member for connection to a corresponding connection element of a line cable carried by the load, wherein the connection device has a manipulator for connection of the connection element to the at least one connection member whereby in the connection device the line cable can be paid out or retrieved from a reservoir carried by the load according to a distance between the reservoir and the feed device, wherein a positioning element assigned to the connection device or the feed device is provided, which is detectable by a sensor unit arranged on the load, wherein the positioning element has reflecting areas for detection by the sensor unit, and wherein the reflecting areas are offset relative to one another in the travel direction of the load and/or are areas with different reflection properties.

22. The power supply system according to claim 21, wherein the positioning element has a QR code for detection by the sensor unit.

23. The power supply system according to claim 21, wherein the reflecting areas and/or areas with different reflection properties are offset relative to one another across the travel direction, especially in the horizontal feed direction of the manipulator.

24. The power supply system according to claim 21, wherein the positioning element has a front central area and at least one edge area offset to the rear and/or to the front relative to the central area in the horizontal feed direction connected in the travel direction.

25. The power supply system according to claim 21, wherein the sensor unit is set up in order to detect the reflecting areas.

26. The power supply system according to claim 21, wherein the sensor unit is set up for distance measurement.

* * * * *